United States Patent
Morishima et al.

[11] Patent Number: 6,160,527
[45] Date of Patent: *Dec. 12, 2000

[54] STEREOSCOPIC IMAGE DISPLAY APPARATUS

[75] Inventors: Hideki Morishima, Kawasaki; Hiroyasu Nose, Tokyo; Naosato Taniguchi, Urawa, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/921,362

[22] Filed: Aug. 29, 1997

[30] Foreign Application Priority Data

Sep. 2, 1996 [JP] Japan .................................. 8-250943

[51] Int. Cl.$^7$ ........................................ G09G 5/00
[52] U.S. Cl. ............................. 345/7; 345/32; 345/151; 348/58; 348/59; 348/54
[58] Field of Search ............................ 348/58, 59, 54, 348/46; 359/462; 345/7, 9, 32, 151

[56] References Cited

U.S. PATENT DOCUMENTS

| | | | |
|---|---|---|---|
| 5,004,335 | 4/1991 | Montes | 352/58 |
| 5,035,473 | 7/1991 | Kuwayama et al. | 350/3.7 |
| 5,089,903 | 2/1992 | Kuwayama et al. | 359/15 |
| 5,162,928 | 11/1992 | Taniguchi et al. | 359/13 |
| 5,210,626 | 5/1993 | Kumayama et al. | 359/13 |
| 5,379,132 | 1/1995 | Kuwayama et al. | 359/13 |
| 5,541,641 | 7/1996 | Shimada | 348/58 |
| 5,541,642 | 7/1996 | Ashbey | 348/59 |
| 5,561,537 | 10/1996 | Aritake et al. | 359/23 |
| 5,589,956 | 12/1996 | Morishima et al. | 359/15 |
| 5,625,493 | 4/1997 | Matsumura et al. | 359/630 |
| 5,663,831 | 9/1997 | Mashitani et al. | 359/463 |
| 5,719,620 | 2/1998 | Allio | 348/49 |
| 5,875,055 | 2/1999 | Morishima et al. | 359/465 |

FOREIGN PATENT DOCUMENTS

| | | |
|---|---|---|
| 0 540 137 | 5/1993 | European Pat. Off. . |
| 0 726 482 | 8/1996 | European Pat. Off. . |
| 0 788 008 | 8/1997 | European Pat. Off. . |
| 2-44995 | 2/1990 | Japan . |
| 2-50145 | 2/1990 | Japan . |
| 5-107663 | 4/1993 | Japan . |
| 7-234459 | 9/1995 | Japan . |

OTHER PUBLICATIONS

H. Isono, et al., "Conditions for Forming a Time–Division Stereoscopic Vision", Journal of the Society of Television, vol. 41, No. 6, pp. 549–555 (1987), and English translation.

Primary Examiner—Richard A. Hjerpe
Assistant Examiner—Marthe Y. Marc-Coleman
Attorney, Agent, or Firm—Fitzpatrick, Cella, Harper & Scinto

[57] ABSTRACT

A stereoscopic image display apparatus for causing an observer to observe a stereoscopic image, includes a light source for illuminating, with a surface illuminant, a mask substrate on which a mask pattern including aperture portions and shielding portions arranged in a checkerboard pattern is formed, a vertical cylindrical lens array including vertical cylindrical lenses each having a generatrix in a vertical direction, and a transmission type display device for displaying an image on scanning lines. Right stripe pixels and left stripe pixels are alternately arranged in a predetermined order to form one image, thereby displaying a horizontal stripe image on a display surface of the display device, and light beams emitted from the light source, to which directivity is given by the vertical cylindrical lens array, irradiate the horizontal stripe image. The light beams are separately condensed on at least two regions to make the observer to see the horizontal stripe image as a stereoscopic image, and a horizontal width of a pair of an aperture portion and a shielding portion arranged on the mask pattern in a horizontal direction is set to be not less than twice a horizontal pixel size of the display device.

29 Claims, 25 Drawing Sheets

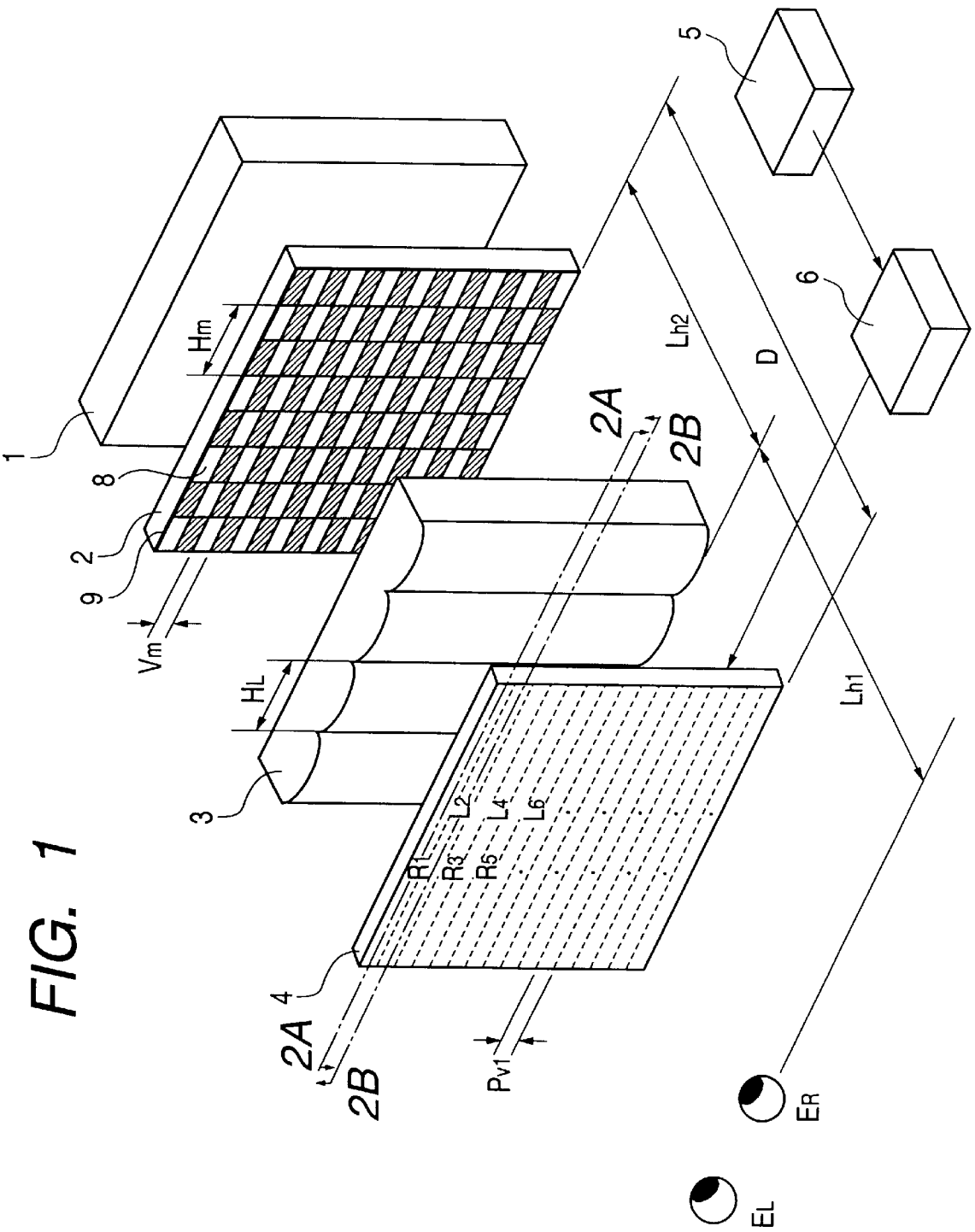

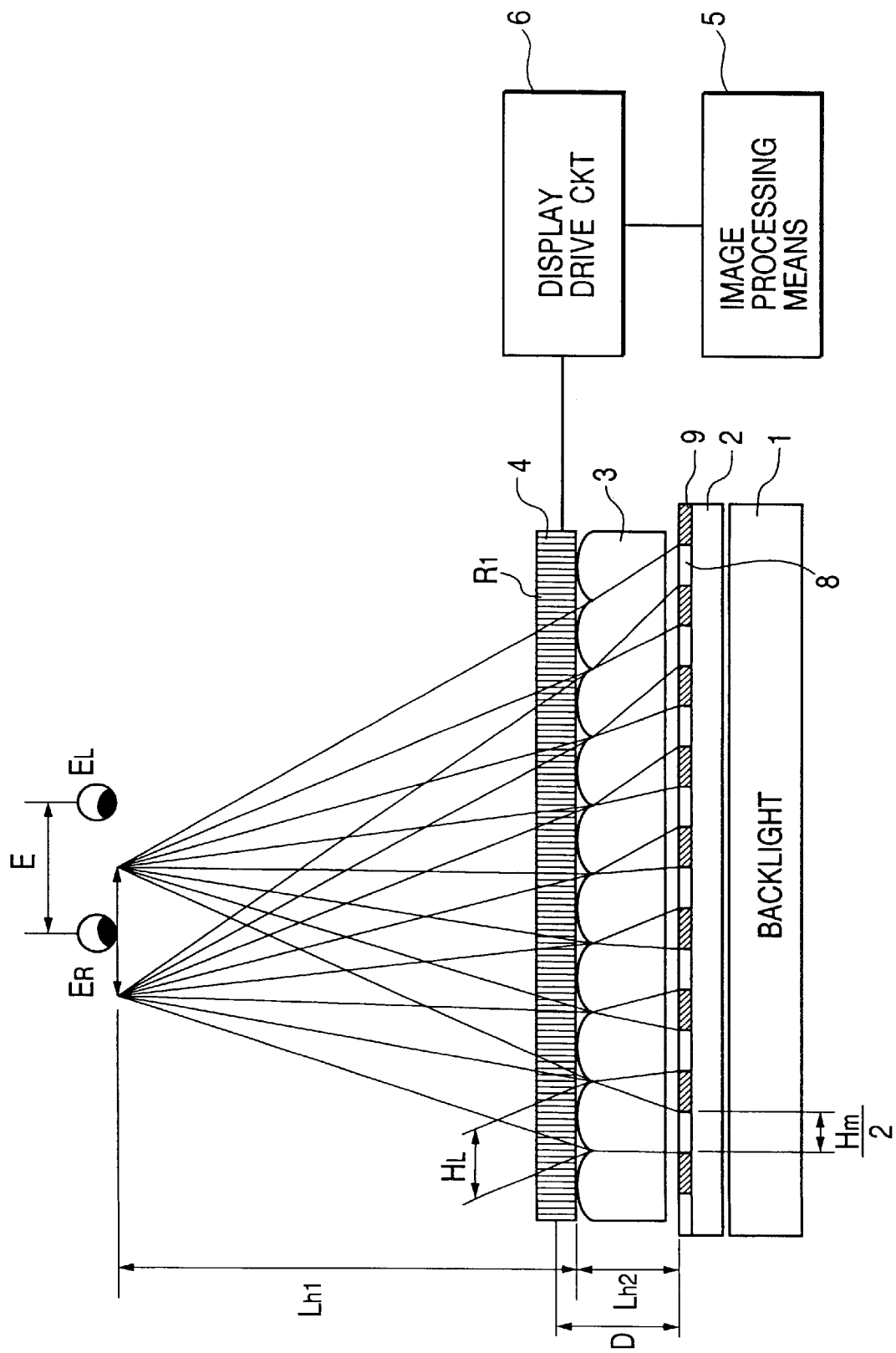

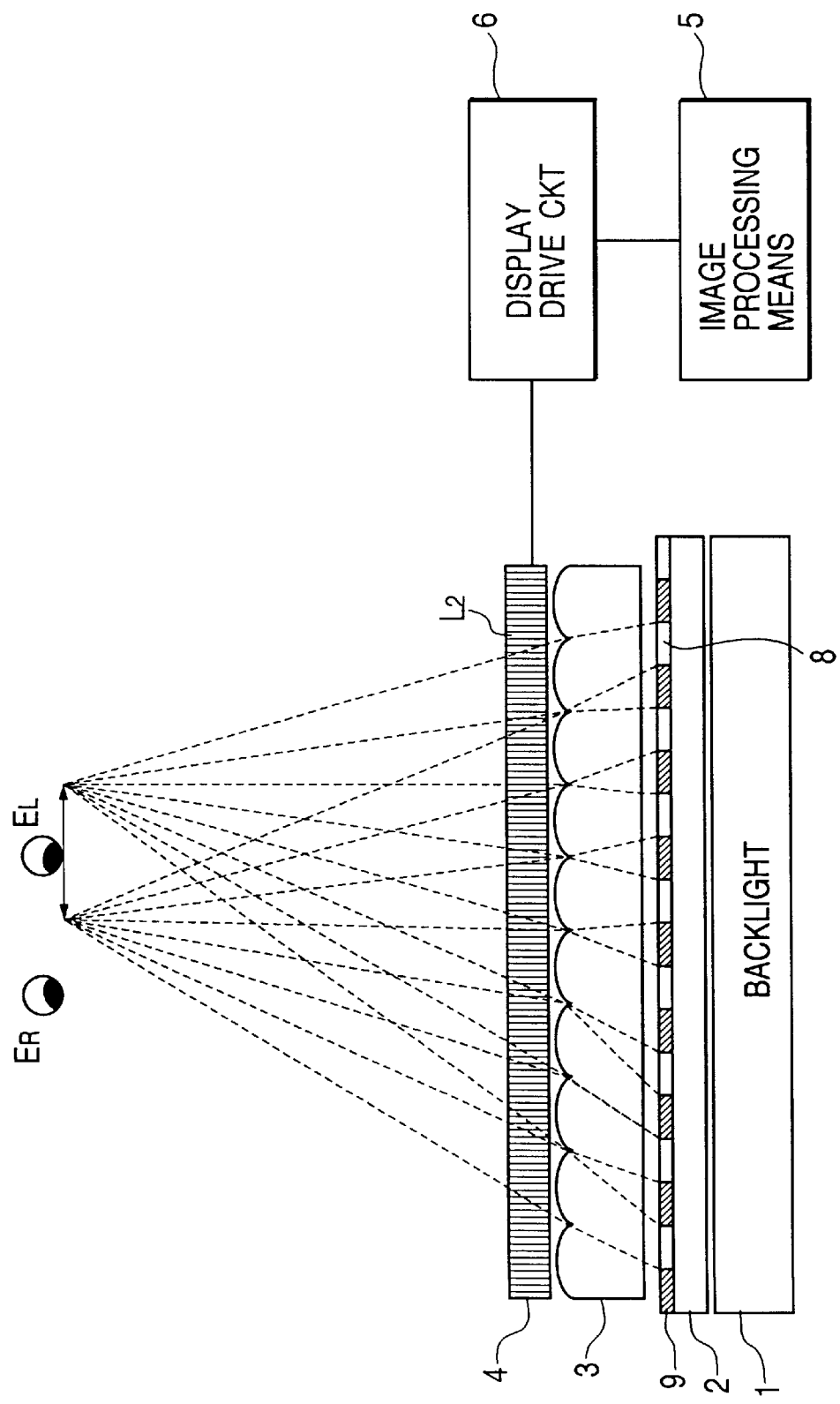

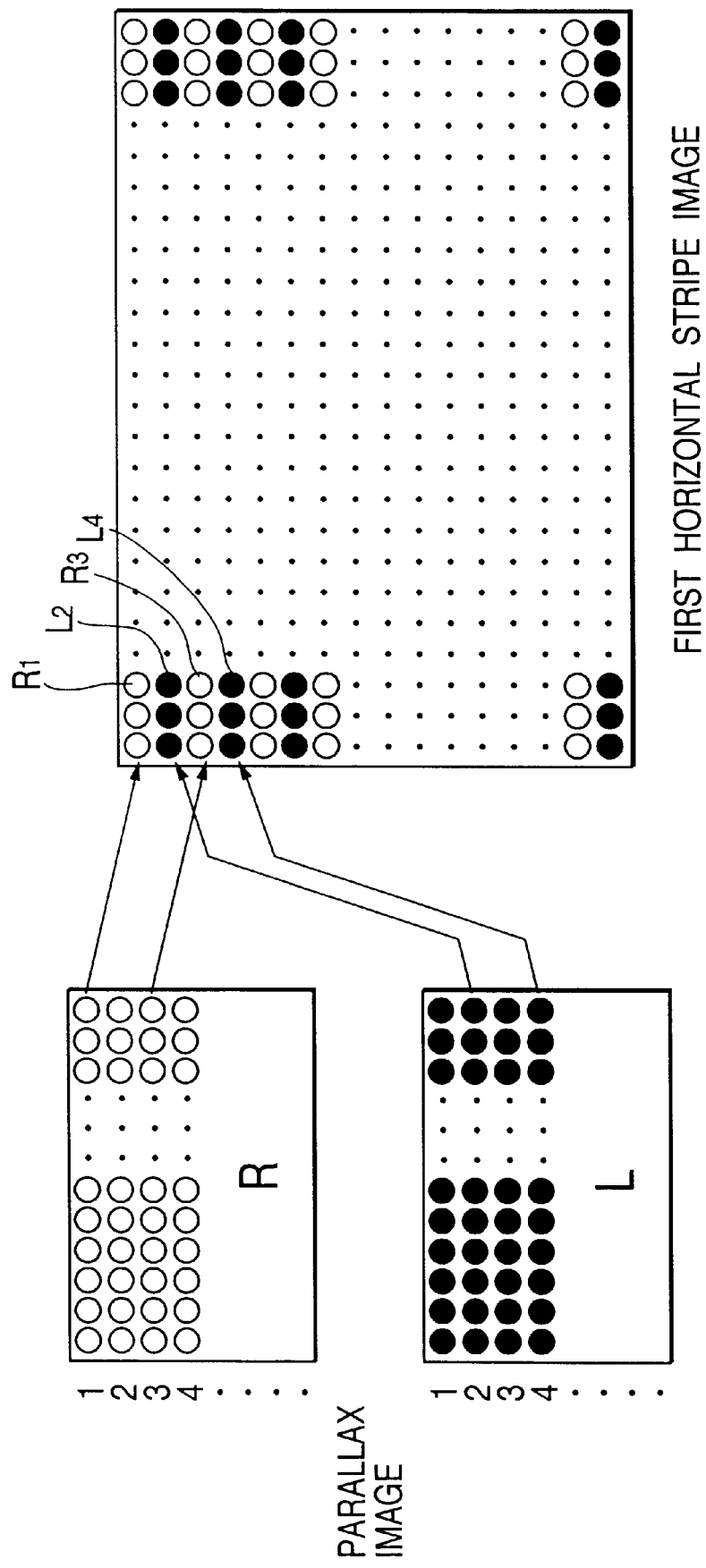

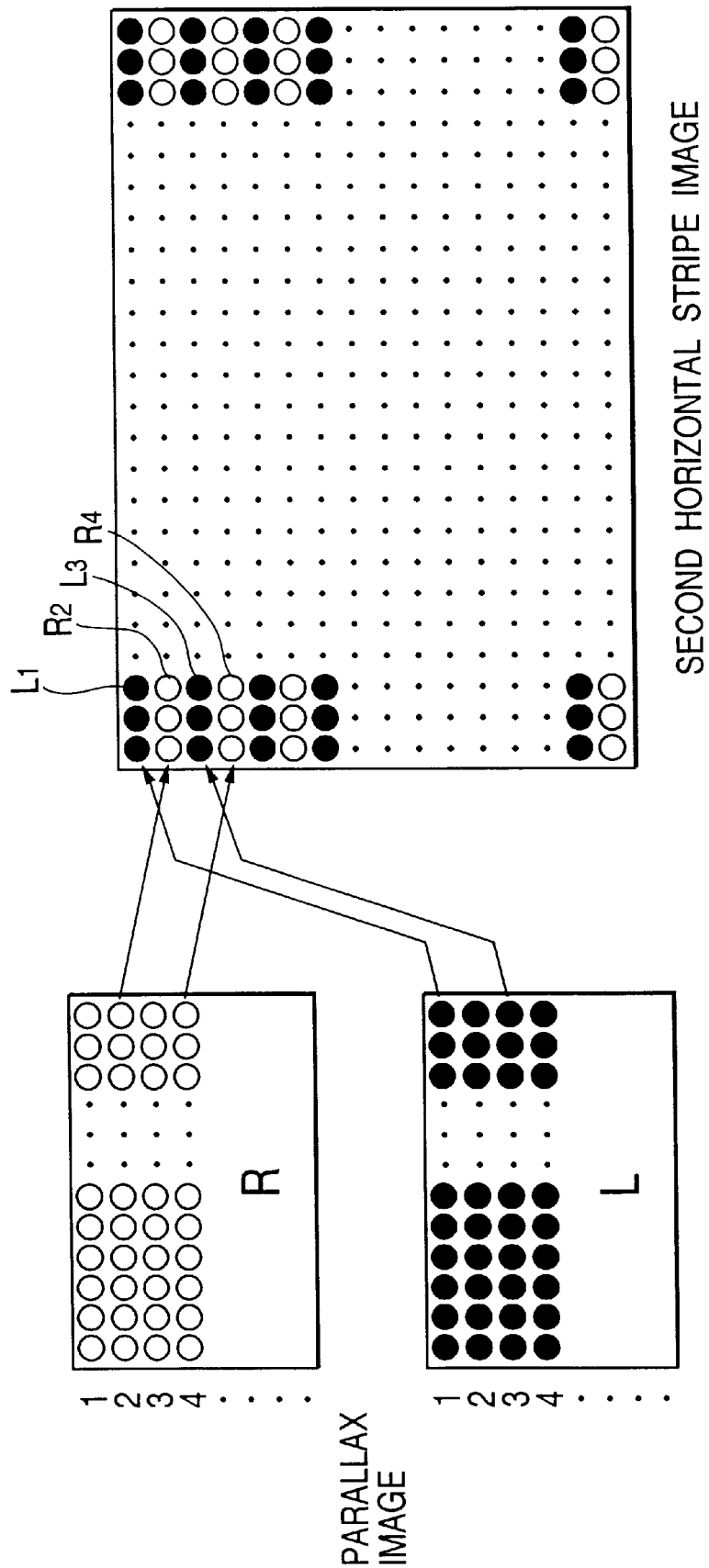

- 101 OPTICAL DIRECTIVITY CHANGING APP.
- 102 MATRIX TYPE SURFACE ILLUMINANT
- 103 LENTICULAR SHEET
- 104 TRANSMISSION-TYPE DISPLAY APP.

L: LIGHT SOURCE FOR LEFT EYE
R: LIGHT SOURCE FOR RIGHT EYE

EVEN NUMBER FRAME    ODD NUMBER FRAME

STEREOSCOPIC IMAGE DISPLAY APPARATUS

BACKGROUND OF THE INVENTION

1. Field of the Invention

The present invention relates to a stereoscopic image display method and a stereoscopic image display apparatus using the method and, more particularly, to a stereoscopic image display apparatus capable of causing an observer to see a stereoscopic image within a wide observation region without using any special glasses.

2. Related Background Art

Conventionally, as a stereoscopic image display apparatus not using any glasses, a lenticular lens type apparatus and a parallax barrier type apparatus are proposed.

In these two types of apparatuses, a lenticular lens or a parallax barrier is arranged on the surface of a liquid crystal display. For this reason, the image quality degrades due to surface reflection from the lens surface, or the black matrix of the liquid crystal display generates a Moire, resulting in an eyesore.

In addition, in these types, a stripe image must be combined by alternately arranging stripe pixels of two parallax images, and the combined image must be displayed. For this reason, the resolution of the stereoscopic image display apparatus is decreased to at least ½ that of the image display means.

A stereoscopic image display apparatus solving these problems is disclosed in Japanese Laid-Open Patent Application Nos. 5-107663 and 7-234459.

FIGS. 22A to 22C are views showing the basic arrangement of the stereoscopic image display apparatus disclosed in Japanese Laid-Open Patent Application No. 5-107663. This apparatus comprises an optical directivity changing apparatus 101 having a matrix type surface illuminant 102 and a lenticular sheet 103, and a transmission type display apparatus 104. While a stripe light source (102R in FIG. 22B) for the right eye is turned on, an image (104R in FIG. 22C) for the right eye is displayed in an odd number frame. While a stripe light source (102L in FIG. 22B) for the left eye is turned on, an image (104L in FIG. 22C) for the left eye is displayed in an even number frame.

Since all pixels are used in the even and odd number frames, an apparatus which does not require division of the pixels and prevents a decrease in resolution can be realized.

However, in the apparatuses of these types, the observer can see the stereoscopic image only within a range corresponding to a binocular center distance of about 65 mm. For this reason, the observer must fix the head position during observation, resulting in difficulty in observation.

In a scheme proposed in Japanese Laid-Open Patent Application No. 2-44995, a lenticular lens is supported to be movable in the horizontal direction, and the positions of both eyes of the observer are detected. The lenticular lens is moved in the left-and-right direction relative to the display element in accordance with the detection result, thereby widening the stereoscopic image region. Japanese Laid-Open Patent Application No. 2-50145 proposes a scheme in which the positions of the eyes of the observer are detected, and the left and right positions of the display pixel portions of an image are replaced, thereby widening the stereoscopic image region.

Of these conventional arts, in the method of time-divisionally displaying the right-eye parallax image and the left-eye parallax image to obtain a stereoscopic image, images must be changed over at a high speed to prevent flicker.

Isono et al. have reported "Conditions for forming a time-division stereoscopic vision" (Journal of the Society for Television, Vol. 41, No. 6 (1987), pp. 549–555). According to this, no stereoscopic image can be formed by time division using a field frequency of 30 Hz.

The critical frequency (critical fusion frequency CFF) at which no flicker is perceived when the left and right eyes are alternately closed is about 55 Hz. From the viewpoint of flicker, the field frequency must be at least 110 Hz.

Therefore, in these conventional arts, a display device capable of displaying an image at a high speed must be used as the transmission type display apparatus 104.

Of these conventional arts, the scheme of measuring the observer position to follow the movement of the observer can cope with only horizontal changes in observer position. When the distance between the observer and the stereoscopic image display apparatus changes, crosstalk is generated to degrade the stereoscopic effect.

When a member such as a lenticular lens is to be actually moved to follow the movement of the observer, such a relatively large member must be precisely moved by a small amount like the pixel pitch or lenticular pitch. This requires a complex and precise driving system, resulting in an expensive apparatus.

When the left and right display pixel portions are replaced to cause the stereoscopic image observation region to follow the movement of the observer, as in Japanese Laid-Open Patent Application No. 2-50145, the unit of follow-up movement almost equals the distance between the eyes of the observer, so that this method cannot cope with fine movement of the observer.

SUMMARY OF THE INVENTION

It is an object of the present invention to provide a stereoscopic image display method which uses a mask pattern and a lenticular lens to control the directivity of light emerging from the aperture portions of the mask pattern and illuminate each stripe pixel of a horizontal stripe image displayed on a display device without generating crosstalk, and causes the left and right eyes of an observer to always see left and right stripe images, respectively, thereby enabling observation of a stereoscopic image within a wide stereoscopic vision observation region without increasing the display rate (frame rate) required of the display device, unlike the conventional method of displaying parallax images in time division, which requires a high frame rate of the display device, and a stereoscopic image display apparatus using this method.

In order to achieve the above object, according to an aspect of the present invention, there is provided a stereoscopic image display apparatus for causing an observer to observe a stereoscopic image, comprising:

light source means for illuminating, with a surface illuminant, a mask substrate on which a mask pattern including aperture portions and shielding portions arranged in a checkerboard pattern is formed;

a vertical cylindrical lens array including vertical cylindrical lenses each having a generatrix in a vertical direction; and a transmission type display device for displaying an image with scanning lines, wherein right stripe pixels and left stripe pixels obtained by dividing a parallax image for a right eye and a parallax image for a left eye into a number of horizontal stripe pixels are alternately arranged in a predetermined order to form one image, thereby displaying a horizontal stripe image on a display surface of the display device, light beams emitted from the light source means, to which directivity is given by the vertical cylindrical lens array, irradiate the horizontal stripe image, the light beams are separately focused on at least two regions make the observer to see the horizontal stripe image as a stereoscopic image, and a horizontal width of a pair of an aperture portion and a shielding portion arranged on the mask pattern in a horizontal direction is set to be not less than twice a horizontal pixel size of the display device.

When an optical distance between the vertical cylindrical lens array and the mask pattern is represented by $L_{h2}$; an optical distance between a predetermined observation position and the vertical cylindrical lens array, $L_{h1}$; a predetermined distance between eyes of the observer, E; and the horizontal width of the pair of an aperture portion and a shielding portion arranged on the mask pattern in the horizontal direction, $H_m$, the following condition is satisfied:

$$H_m = 2E \cdot L_{h2}/L_{h1}$$

The apparatus further comprises a horizontal cylindrical lens array arranged between the mask pattern and the display device and includes horizontal cylindrical lenses each having a generatrix in the horizontal direction.

The vertical cylindrical lens array converts a light beam emerging from one point of the aperture portion into a substantially collimated light beam in a horizontal section, and the horizontal cylindrical lens array substantially focuses the light beam emerging from one point of the aperture portion onto a predetermined position of the display device in a vertical section.

An optical distance between the mask pattern and the vertical cylindrical lens array is set to be larger than a converted distance between the mask pattern and the horizontal cylindrical lens array.

A vertical width of the aperture portion is made to correspond to a width of a plurality of scanning lines of the display device.

A vertical width of a horizontal stripe pixel displayed on the display device is made equal to the width of the plurality of scanning lines of the display device, which corresponds to the vertical width of the aperture portion.

According to another aspect of the present invention, there is provided a stereoscopic image display apparatus for causing an observer to observe a stereoscopic image, comprising:

light source means for illuminating, with a surface illuminant, a mask substrate on which a mask pattern including aperture portions and shielding portions arranged in a checkered pattern is formed;

a vertical cylindrical lens array including vertical cylindrical lenses each having a generatrix in a vertical direction;

a horizontal cylindrical lens array including horizontal cylindrical lenses each having a generatrix in a horizontal direction; and a transmission type display device for displaying an image on scanning lines, wherein the stripe pixels for right eye and the stripe pixels for left eye obtained by dividing a parallax image for a right eye and a parallax image for a left eye into a number of horizontal stripe pixels are alternately arranged in a predetermined order to form one image, thereby displaying a horizontal stripe image on the display device, light beams emitted from the light source means, to which directivity is given by the vertical cylindrical lens array, irradiate the horizontal stripe image, the light beams are separated into at least two regions to make the observer see the horizontal stripe image as a stereoscopic image, the vertical cylindrical lens array converts a light beam emerging from one point of the aperture portion into a substantially collimated light beam in a horizontal section, the horizontal cylindrical lens array substantially focuses the light beam emerging from one point of the aperture portion onto the display device in a vertical section, a converted distance between the mask pattern and the vertical cylindrical lens array is set to be larger than a converted distance between the mask pattern and the horizontal cylindrical lens array, and a vertical width of the aperture portion is made to correspond to a width of a plurality of scanning lines of the display device.

The vertical cylindrical lens array or the horizontal cylindrical lens array has plano-convex cylindrical lenses.

According to still another aspect of the present invention, there is provided a stereoscopic image display apparatus for causing an observer to observe a stereoscopic image, comprising:

light source means whose light-emission pattern including light-emitting portions and non-emitting portions arranged in a checkered pattern is formed by a display element having a discrete pixel structure;

a vertical cylindrical lens array including vertical cylindrical lenses each having a generatrix in a vertical direction; and a transmission type display device having a discrete pixel structure to display an image on scanning lines, wherein the stripe pixels for right eye and the stripe pixels for left eye obtained by dividing a parallax image for a right eye and a parallax image for a left eye into a number of horizontal stripe pixels are alternately arranged in a predetermined order to form one image, thereby displaying a horizontal stripe image on the display device, light beams emitted from the light source means, to which directivity is given by the vertical cylindrical lens array, irradiate the horizontal stripe image, the light beams are separately condensed on at least two regions to make the observer see the horizontal stripe image as a stereoscopic image, and a horizontal width of a pair of a light-emitting portion and a non-emitting portion arranged on the light-emission pattern in a horizontal direction is not less than twice a horizontal pixel size of the display device.

The light source means has a self-emission type display element having a discrete pixel structure.

The light source means has means for forming a mask pattern including aperture portions and shielding portions arranged in a checkerboard pattern on a display surface of an optical modulator having a discrete pixel structure and illuminating the mask pattern with a surface illuminant.

The apparatus further comprises a horizontal cylindrical lens array arranged between the light source means and the display device and including horizontal cylindrical lenses each having a generatrix in the horizontal direction, wherein a light beam emerging from one point of the light-emitting portion is focused onto the display device as a caustic curve.

When a vertical width of a right or left stripe pixel on the display device is represented by $P_{V1}$; a vertical width of the light-emitting portion, $V_m$; a vertical pitch of the horizontal cylindrical lens, $V_L$; a converted distance between the display device and the horizontal cylindrical lens array, $L_{V1}$; a converted distance between the horizontal cylindrical lens array and the light source means, $L_{V2}$; and a focal length of the horizontal cylindrical lens in a vertical section, $f_V$, the following conditions are satisfied:

$$P_{V1} \cdot V_m = L_{V1} \cdot L_{V2}$$

$$P_{V1} \cdot V_L = (L_{V1} + L_{V2})/2 \cdot L_{V2}$$

$$1/f_V 32\ 1/L_{V1} + 1/L_{V2}$$

When a converted distance between the vertical cylindrical lens array and the light source means is represented by $L_{h2}$; a converted distance between a predetermined observation position and the display device, $L_{h1}$; a predetermined distance between eyes of the observer, E; and the horizontal pixel size of the display element, $P_{h2}$, the following condition is satisfied:

$$L_{h2} > P_{h2} \cdot L_{h1}/E$$

When a converted distance between the vertical cylindrical lens array and the light source means is represented by $L_{h2}$; a converted distance between a predetermined observation position and the display device, $L_{h1}$; a predetermined distance between eyes of the observer, E; and the horizontal pixel size of the display element, $P_{h2}$, the following condition is satisfied:

$$L_{h2} = k \cdot P_{h2} \cdot L_{h1}/E$$

where k is a predetermined integer not less than 2.

When a converted distance between the vertical cylindrical lens array and the light source means is represented by $L_{h2}$; a converted distance between a predetermined observation position and the display device, $L_{h1}$; and the horizontal pixel size of the display element, $P_{h2}$, the light-emitting portions are moved in the horizontal direction in units of $P_{h2}$, thereby moving the regions where light beams having information of the right stripe pixels and light beams having information of left stripe pixels are separately condensed, in the horizontal direction using the following value as a unit:

$$Ph2 \cdot Lh1/Lh2$$

The apparatus further comprises position detection means for detecting a position of the observer, a horizontal positional shift of the observer from a predetermined reference position is detected by the position detection means, and the light-emitting portions are moved in the horizontal direction in accordance with the positional shift.

The light-emission pattern is formed by repeatedly arranging a unit in which a light-emitting portion and a non-emitting portion each having a predetermined size are repeated a predetermined number of times in the horizontal direction, and each of a plurality of light-emitting portions and non-emitting portions in the unit is constituted by one of at least two different numbers of pixels in the horizontal direction.

The light-emission pattern is formed by repeating a unit including n light-emitting portions and n non-emitting portions in the horizontal direction, a horizontal size of a jth (j=1, . . . , n) light-emitting portion or a jth non-emitting portion is set to be $k_j$-times the horizontal pixel size $P_{h2}$ of the display element using predetermined positive integers $k_1, k_2, \ldots, k_n$, and when a horizontal pitch of the vertical cylindrical lens is represented by $H_L$; and a converted distance between the vertical cylindrical lens array and the light source means, $L_{h2}$, a distance $L_0$ from the display device to the regions where light beams having information of the right stripe pixels and light beams having information of left stripe pixels are separately focused is changed according to the following equation:

$$L_0 = L_{h2} \cdot H_L \bigg/ \left\{ \sum_{j=1}^{n} (k_j \cdot P_{h2})/n - H_L \right\}$$

The apparatus further comprises position detection means for detecting a position of the observer, and a memory recording a predetermined positive integer string $(k_1, k_2, \ldots, k_n)_k$ which is set for a plurality of distances $L_{0i}$ in advance in accordance with the following equation:

$$L_{0i} = L_{h2} \cdot H_L \bigg/ \left\{ \sum_{j=1}^{n} (k_j \cdot P_{h2})/n - H_L \right\}$$

where $H_L$ is the horizontal pitch of the vertical cylindrical lens, $L_{h2}$ is a converted distance between the vertical cylindrical lens array and the light source means, and $P_{h2}$ is the horizontal pixel size of the display element, wherein the light-emission pattern is formed by repeating a unit including n light-emitting portions and n non-emitting portions in the horizontal direction, the integer string $(k_1, k_2, \ldots, k_n)_k$ is selected in accordance with a distance $L_0$ from the display device to the observer, which is measured by the position detection means in a direction perpendicular to the display surface of the display device, and a horizontal size of an ith light-emitting portion and an ith non-emitting portion in the unit is set to be $k_j$-times the pixel size $P_{h2}$ using the integer string $(k_1, k_2, \ldots, k_n)_k$.

According to still another aspect of the present invention, there is provided a stereoscopic image display apparatus for causing an observer to observe a stereoscopic image, comprising:

light source means for illuminating, with a surface illuminant, a mask substrate on which a mask pattern including aperture portions and shielding portions arranged in a checkerboard pattern is formed;

a vertical cylindrical lens array including vertical cylindrical lenses each having a generatrix in a vertical direction; and a transmission type display device for displaying an image on scanning lines, wherein right stripe pixels and left stripe pixels obtained by dividing a parallax image for a right eye and a parallax image for a left eye into a number of horizontal stripe pixels are alternately arranged in a predetermined order to form one image, thereby displaying a horizontal stripe image on a display surface of the display device, light beams emitted from the light source means, to which directivity is given by the vertical cylindrical lens array, irradiate the horizontal stripe image, the light beams are separately condensed on at least two regions to make the observer to see the horizontal stripe image as a stereoscopic image, and a vertical width of the aperture portion is smaller than that of the shielding portion.

According to still another aspect of the present invention, there is provided a stereoscopic image display apparatus for causing an observer to observe a stereoscopic image, comprising:

light source means whose light-emission pattern including light-emitting portions and non-emitting portions arranged in a checkerboard pattern is formed by a display element having a discrete pixel structure;

a vertical cylindrical lens array including vertical cylindrical lenses each having a generatrix in a vertical direction; and a transmission type display device having a discrete pixel structure to display an image on scanning lines, wherein right stripe pixels and left stripe pixels obtained by dividing a parallax image for a right eye and a parallax image for a left eye into a number of horizontal stripe pixels are alternately arranged in a predetermined order to form one image, thereby displaying a horizontal stripe image on a display surface of the display device, light beams emitted from the light source means, to which directivity is given by the vertical cylindrical lens array, irradiate the horizontal stripe image, the light beams are separately condensed on at least two regions to make the observer to see the horizontal stripe image as a stereoscopic image, and a vertical width of the light-emitting portion is smaller than that of the non-emitting portion.

The light source means has a self-emission type display element having a discrete pixel structure.

The light source means has means for forming a mask pattern including aperture portions and shielding portions arranged in a checkerboard pattern on a display surface of an optical modulator having a discrete pixel structure and illuminating the mask pattern with a surface illuminant.

Details of the present invention will be apparent from some embodiments to be described later.

BRIEF DESCRIPTION OF THE DRAWINGS

FIG. 1 is a schematic perspective view of a stereoscopic image display apparatus according to the first embodiment of the present invention;

FIGS. 2A and 2B are explanatory views of the function of the first embodiment;

FIGS. 3A and 3B are explanatory views of the horizontal stripe image combining method of the first embodiment;

DETAILED DESCRIPTION OF THE PREFERRED EMBODIMENTS

Figure 4:
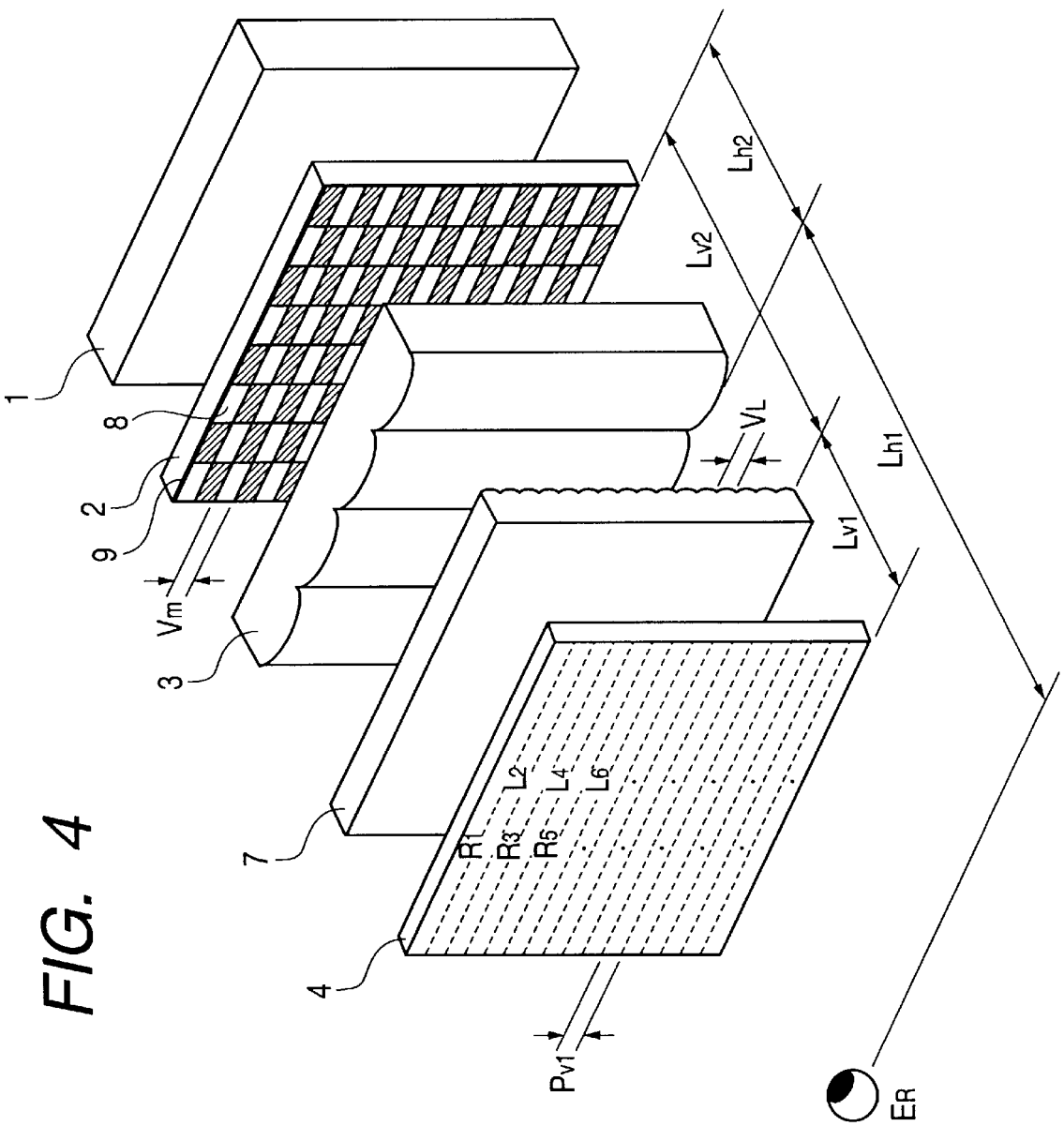
FIG. 4 is a schematic perspective view of a stereoscopic image display apparatus according to the second embodiment of the present invention.

FIG. 1 is a schematic perspective view of a stereoscopic image display apparatus according to the first embodiment of the present invention. FIGS. 2A and 2B are explanatory views of the first embodiment. In FIG. 1, a section taken along a horizontal plane including a line A corresponds to FIG. 2A, and a section taken along a horizontal plane including a line B (line along a scanning line immediately under the scanning line along the line A) corresponds to FIG. 2B.

Referring to FIGS. 1, 2A, and 2B, the stereoscopic image display apparatus has a backlight source 1 and a mask 2. The mask 2 has, on its surface, a mask pattern 9 having predetermined aperture portions and shielding portions. The mask pattern 9 is formed by patterning chromium, chromium oxide, or a light-absorbing member such as a resin black matrix on a mask substrate consisting of glass, plastic, or the like. The mask 2 and the backlight source 1 constitute a light source means.

A vertical lenticular lens (vertical cylindrical lens array) 3 is constituted by arranging a number of plano-convex vertical cylindrical lenses in the horizontal direction. The lens curvature of the vertical lenticular lens 3 is set such that the mask pattern 9 is located nearly at the focal point of each cylindrical lens of the vertical lenticular lens 3. A pair of an aperture portion 8 and a shielding portion arranged on the mask pattern 9 in the horizontal direction correspond to one pitch (width) $H_L$ of each vertical cylindrical lens of the vertical lenticular lens 3.

A display device 4 is constituted by a transmission type liquid crystal element or the like. image displayed on the image display screen. In FIGS. 2A and 2B, the cover glass plates, the polarizing plates, and the electrodes of the liquid crystal element are omitted. An image processing means 5 combines a stripe image from a plurality of parallax images. A display drive circuit 6 drives the display device 4 upon receiving a stripe image signal from the image processing means 5 to display a stripe image on the display device 4.

The function of the first embodiment will be described. First, the stripe image to be displayed on the display device 4 will be described. FIGS. 3A and 3B are explanatory views of stripe image combination. As shown in FIG. 3A, the image processing means 5 divides at least two parallax images, i.e., a right parallax image R and a left parallax image L into a number of horizontal stripe pixels and alternately arranges stripe pixels $R_i$ formed from the right parallax image R and stripe pixels $L_i$ formed from the left parallax image L on scanning lines. More specifically, a right stripe pixel $R_1$ on the first scanning line, a left stripe pixel $L_2$ on the second scanning line, a right stripe pixel $R_3$ on the third scanning line, . . . are combined to form one horizontal stripe image (this horizontal stripe image will be referred to as the first horizontal stripe image).

The image data of the horizontal stripe image prepared in the above way is input to the display drive circuit 6, so that the horizontal stripe image is displayed on the display device 4.

The function of displaying a stereoscopic image will be described next. As shown in FIG. 2A, light beams emitted from the backlight source 1 are transmitted through the mask 2 and separately focused and incident on a region where a right eye $E_R$ of the observer should be located through the mask pattern 9 on which the center of each aperture portion 8 is located at a position shifted from the optical axis of a corresponding cylindrical lens of the vertical lenticular lens 3 by a predetermined amount, and the vertical lenticular lens 3. The light beams incident on the right eye $E_R$ are modulated by the image (right stripe pixel $R_1$ formed from the right parallax image R) displayed on the display device 4 arranged between the vertical lenticular lens 3 and the observer, so that light beams which have passed through the linear right stripe pixel $R_1$ are incident on the right eye $E_R$. Similarly, for light beams along the section corresponding to the scanning line immediately under the scanning line shown in FIG. 2A, light beams which have passed through the linear left stripe pixel $L_2$ are separately focused and incident on a left eye $E_L$. As is apparent from FIG. 1, the mask aperture portions on the section shown in FIG. 2A and those on the section shown in FIG. 2B are complementary. That is, the aperture and shielding portions of the mask pattern 9 are arranged in a checkerboard pattern.

The display device 4 displays the horizontal stripe image obtained by alternately arranging the stripe pixels $R_i$ and $L_i$ corresponding to the respective aperture portions in the vertical direction and combining the stripe pixels. The observer sees, with the left and right eyes, stripe pixels corresponding to the respective eyes in units of scanning lines. Therefore, the left and right eyes can see corresponding parallax images, so that a stereoscopic image can be observed as a whole.

The mask pattern 9 has an appropriate aperture ratio in the vertical direction such that the left and right stripe pixels constituting the stripe image are illuminated without crosstalk.

Images such as CG images created on a computer, or a plurality of natural images taken by a dual-lens camera or a stereoscopic camera may be used as parallax images in this embodiment.

In the above description, the first horizontal stripe image is displayed. Instead, a horizontal stripe image (to be referred to as the second horizontal stripe image) formed by combining a left stripe pixel $L_1$ on the first scanning line, a right stripe pixel $R_2$ on the second scanning line, a left stripe pixel $L_3$ on the third scanning line, . . . may also be used, as shown in FIG. 3B. In this case, the aperture portions of the mask pattern 9 in use of the first horizontal stripe image shown in FIG. 3A may be shifted to the right or left by $H_m/2$. Alternatively, the scanning lines of the display device 4 may be shifted upward or downward by one line.

The formation conditions of each optical element will be described. In this specification, a converted distance is used for the distance between optical elements. The converted distance is a so-called optical distance obtained by converting the distance between two optical elements into a value in the air using, as reference points, the display surface of the display device, the surface of the mask on which the mask pattern 9 is formed, and the principal point on the target distance measurement side of the lenticular lens. The reference points of an optical modulator and a self-emission type display element in embodiments to be described later are the display surface and the light-emission surface, respectively.

As shown in FIG. 2A, the converted distance between the vertical lenticular lens 3 and the mask pattern 9 (optical interval obtained by converting the distance between the mask-side principal point of the vertical lenticular lens 3 and the mask pattern 9 into a value in the air) is represented by $L_{h2}$; the distance from a predetermined observation position to the vertical lenticular lens 3 (optical interval obtained by converting the distance between the observation position and the observer-side principal point of the vertical lenticular lens 3 into a value in the air), $L_{h1}$; a predetermined distance between the eyes of the observer, E; the horizontal width (pitch) of a pair of an aperture portion and a shielding portion arranged on the mask pattern 9 in the horizontal direction, $H_m$; and the pitch (width) of each vertical cylindrical lens of the vertical lenticular lens 3, $H_L$. At this time, this embodiment satisfies the following conditions:

$$L_{h1} : L_{h2} = E : \frac{H_m}{2} \tag{1}$$

$$L_{h1} : (L_{h1} + L_{h2}) = H_L : H_m \tag{2}$$

As shown in FIG. 1, the vertical width of the aperture portion 8 of the mask pattern 9 is represented by $V_m$; the vertical width of the stripe pixel of the display device 4 (in this case, this width corresponds to the scanning line width), $P_{V1}$; and the converted distance between the mask 2 and the display device 4 (optical interval obtained by converting the distance between the mask pattern 9 and the display surface of the display device 4 into a value in the air), D. These specifications are set to satisfy equation (6) below:

$$V_m = P_{V1} \cdot \frac{L_{h1}}{(L_{h1} - D)} \tag{6}$$

Figure 13:
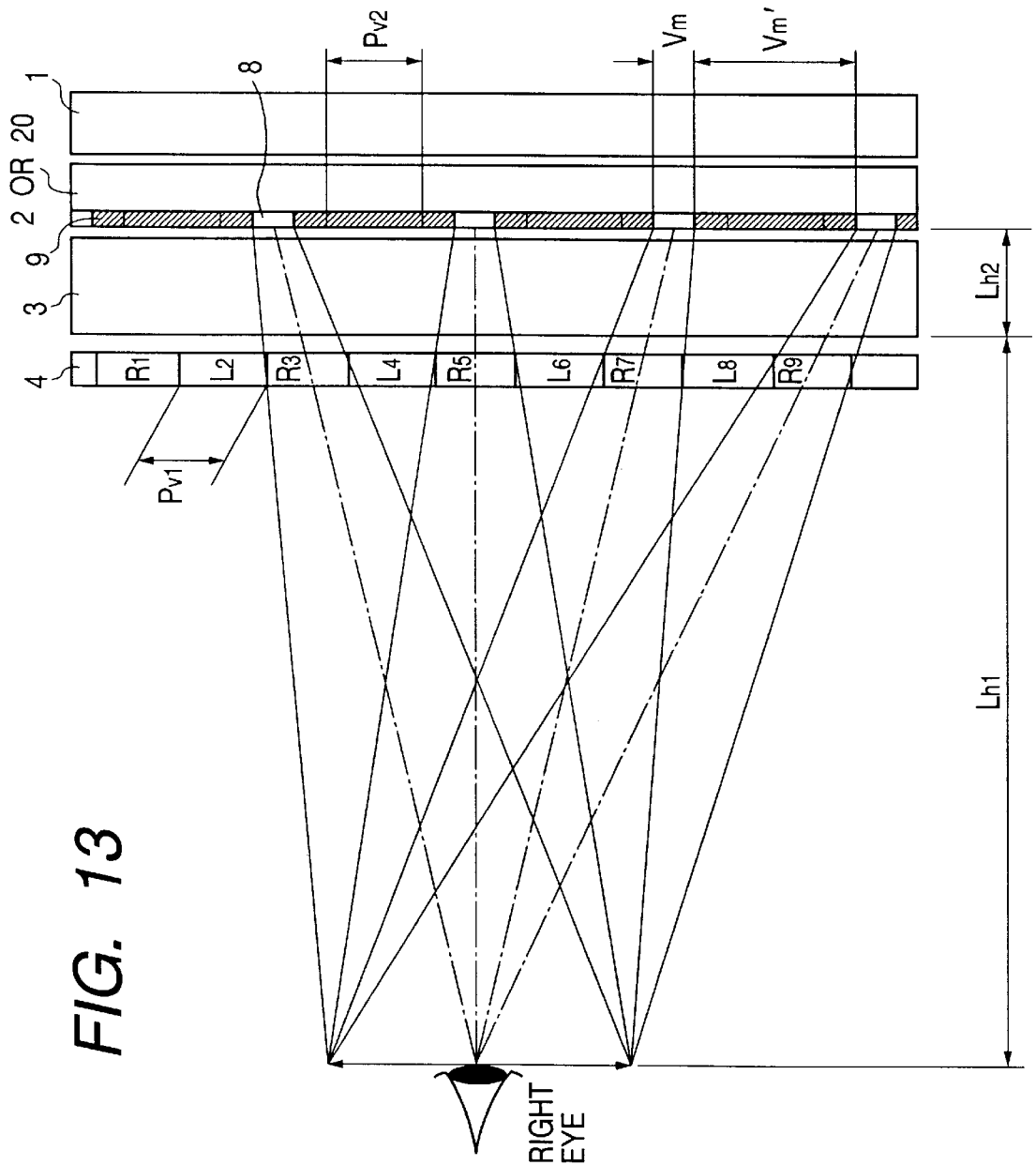
FIG. 13 is a sectional view for explaining the function of the vertical section of the first and fifth embodiments.

This embodiment has a special arrangement to widen the observation region in the vertical direction. FIG. 13 is a side view of the vertical section of this embodiment. The observation region in the vertical direction will be described with reference to FIG. 13. The aperture portions 8 formed on the mask 2 are arranged in a checkerboard pattern, as shown in FIG. 1. The aperture portions 8 correspond, in the vertical direction, to the right or left stripe pixels of the horizontal stripe image displayed on the display device 4. The plurality of aperture portions 8 shown in FIG. 13 correspond to right stripe pixels.

In FIG. 13, $P_{V2}$ corresponds to ½ the vertical pitch of the aperture portion of the mask pattern 9. Half of the vertical pitch $P_{V2}$ of the aperture portions, i.e., ½$P_{V2}$ is set to be slightly larger than the vertical width $P_{V1}$ of the stripe pixel of the horizontal stripe image. For this reason, the observer located at a position separated from the display device 4 by a predetermined observation distance can observe the corresponding aperture portions through the stripe pixels displayed on the display device 4. When the eyes of the observer are set at a predetermined height, an observation region where the left and right images can be uniformly separately observed over the total vertical width-of the screen can be obtained.

The vertical width $V_m$ of the aperture portion 8 of the mask pattern 9 is set to be smaller than the width $P_{V1}$ of the stripe pixel, and the vertical width $V_m$ of the aperture portion 8 is set to be smaller than the vertical width $V_m'$ of the shielding portion. With this arrangement, even when the observer moves in the vertical direction, and the relative positions of pixels and corresponding aperture portions are slightly shifted, light beams from the corresponding aperture portion never illuminate neighboring stripe pixels. Therefore, the observation region in the vertical direction can be extended to a range indicated by an arrow in FIG. 13.

The above function can be realized by setting ½ the vertical pitch $P_{V2}$ of the aperture portion of the mask pattern 9 to be slightly larger than the vertical width $P_{V1}$ of the stripe pixel displayed on the display device 4 to adjust the vertical aperture ratio of the aperture portion 8.

In this embodiment, a liquid crystal element having an RGB vertical stripe pixel array whose pixel pitch is 0.111 mm (horizontal)×0.33 mm (vertical) is used as the display device 4. $L_{h1}$ is 500 mm, $L_{h2}$ is 5 mm, and E is 65 mm. Therefore, $H_m/2$ is 0.65 mm, and $H_L$ is 1.287 mm. The horizontal width $H_m/2$ of the aperture portion 8 equals the width of about six pixels (two picture elements) of the display device 4. In addition, the lens pitch $H_L$ of the vertical lenticular lens 3 can be increased to 1.287 mm. This facilitates the manufacture of the optical elements and allows cost reduction.

In this embodiment, a display device whose vertical pixel size is 0.33 mm is used, and D is set at about 6 mm. Therefore, $P_{V1}$ is 0.33 mm, and the vertical width $V_m$ of the aperture portion of the mask pattern 9 is 0.334 mm.

As described above, in this embodiment, the mask pattern 9 and the vertical lenticular lens 3 are used to control the directivity of light beams emitted from the backlight source 1. The horizontal stripe image to be displayed on the display device 4 is combined from the left and right parallax images in units of scanning lines. The left and right stripe pixels constituting the horizontal stripe image are illuminated without crosstalk, and the light beams are made incident on the eyes of the observer. With this arrangement, the display rate (frame rate) of the display device 4 need not be increased.

In this embodiment, since the horizontal stripe image can be combined from the left and right parallax images in units of scanning lines, the horizontal pixel arrangement of the display device 4 is not restricted. When a liquid crystal element using vertical stripe color filters is used as the display device 4, a color stereoscopic image can be easily displayed.

In addition, the vertical lenticular lens 3 and the mask 2 are arranged behind the display device 4 for displaying an image when viewed from the observer side, thereby giving directivity to illumination light. With this arrangement, no high-contrast Moiré is generated by surface reflection on the vertical lenticular lens 3 or the black matrix of the display device 4 constituted by the liquid crystal element.

In this embodiment, the vertical lenticular lens 3 formed by plano-convex vertical cylindrical lenses is used as a vertical cylindrical lens array. Generally, a cylindrical lens array having appropriate curvatures on both sides may be used to substantially focus light beams from the backlight source 1 to the respective eyes.

Furthermore, when chromium, chromium oxide, or a light-absorbing member such as a resin black matrix is to be patterned on a glass or plastic substrate to form the mask pattern 9, a high-reflection member of chromium or aluminum may be formed on the surface on the side of the backlight source 1, and a low-reflection member of chromium oxide or the light-absorbing member such as a resin black matrix may be formed on the resultant structure. With this structure, light beams from the backlight source 1 can be efficiently used to increase the display brightness.

Furthermore, unnecessary re-reflection by the vertical lenticular lens 3 or the like can be prevented by the low-reflection member formed on the surface, so that a high-contrast stereoscopic image can be displayed.

FIG. 4 is a schematic perspective view of a stereoscopic image display apparatus according to the second embodiment of the present invention. In the first embodiment, the aperture ratio associated with the vertical direction of the mask pattern 9 is appropriately adjusted to illuminate the left or right stripe pixels constituting the horizontal stripe image without any crosstalk.

In the second embodiment, a horizontal lenticular lens 7 having an imaging function in the vertical direction is added to the first embodiment. With this arrangement, a predetermined pixel (one scanning line in the embodiment) of a display device 4 is illuminated without any crosstalk with light beams emerging from the aperture portions of a mask pattern 9.

In FIG. 4, the horizontal lenticular lens 7 (horizontal cylindrical lens array) is constituted by arranging a lot of plano-convex horizontal cylindrical lenses in the vertical direction. The function of the horizontal lenticular lens 7 will be described later. In this embodiment, light beams emerging from aperture portions 8 of the mask pattern 9 and extending in the vertical direction are condensed on a predetermined stripe pixel on the display device 4 to illuminate on the stripe pixel. The light beams are transmitted through the stripe pixel and diverge only in the vertical direction in accordance with the NA in focusing. When the eyes of the observer are set at a predetermined height, an observation region where the left and right images can be uniformly separately observed over the total vertical width of the screen can be obtained. The function of this embodiment will be described. Since the horizontal lenticular lens 7 has no optical power in the horizontal direction, the function of this embodiment associated with the horizontal direction is the same as that of the first embodiment. More specifically, the display device 4 displays the same horizontal stripe image as in the first embodiment. Light beams from a backlight source 1 are transmitted through the aperture portions 8 of the mask pattern 9 to illuminate the display device 4 through a vertical lenticular lens 3. The light beams are focused while separating left and right stripe pixels into the left and right eye regions of the observer, respectively, thereby allowing the observer to see the left and right parallax images.

Figure 5:
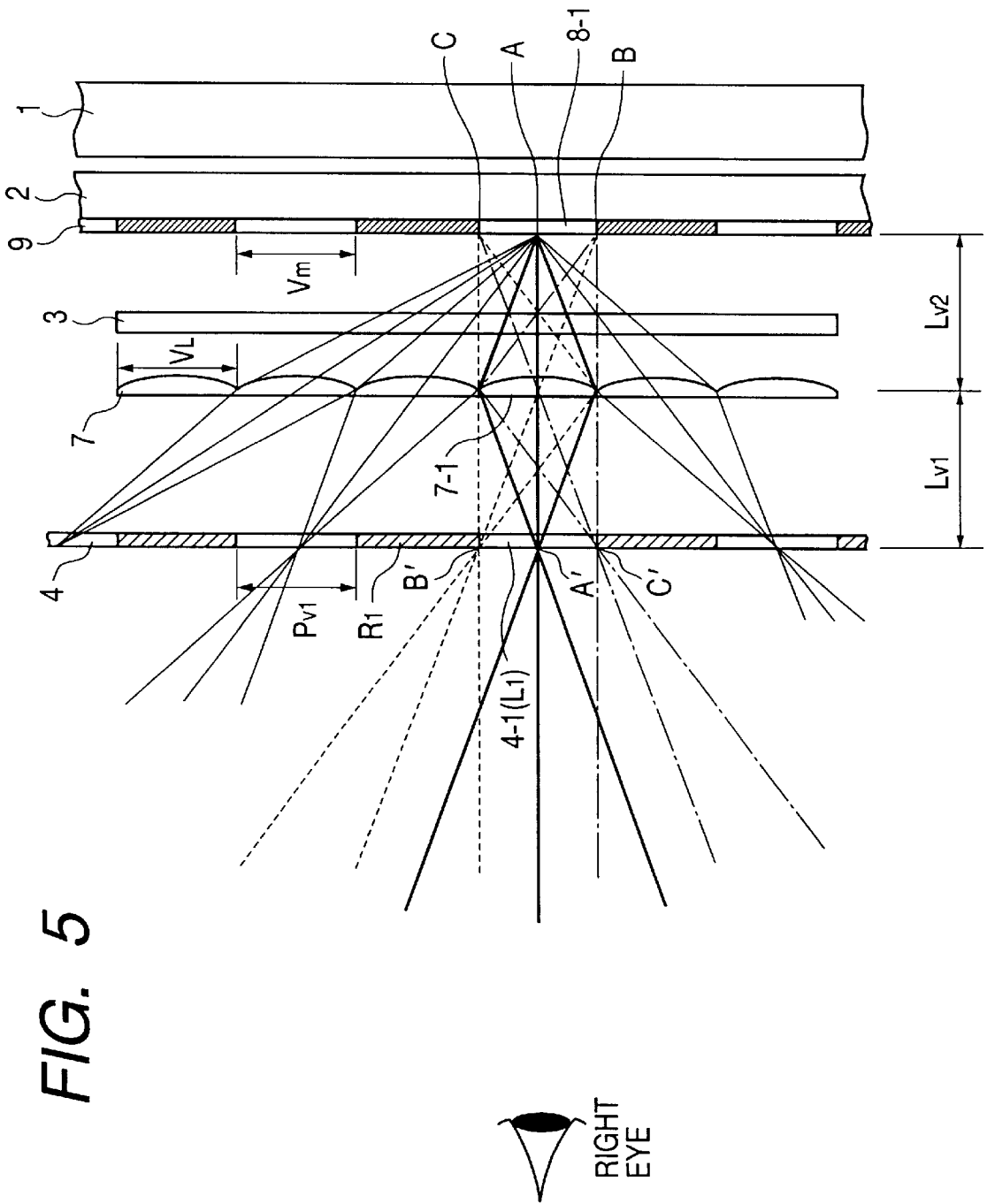
FIG. 5 is a sectional view for explaining the function of the vertical section of the second embodiment.

FIG. 5 is a sectional view for explaining the function of the vertical section of the second embodiment. The observation region in the vertical direction will be described with reference to FIG. 5. The aperture portions of the mask pattern 9 are arranged in a checkerboard pattern, as shown in FIG. 4. The aperture portions correspond, in the vertical direction, to the respective stripe pixels of the horizontal stripe image displayed on the display device 4.

The aperture portions of the mask pattern 9 shown in FIG. 5 are to illuminate the stripe pixels for the right or left eye of the observer. An explanation will be made while assuming that stripe pixels ($L_i$) for the left eye of the observer are illuminated. The left stripe pixels of the display device 4, which correspond to the left eye, are represented by blank portions, and the right stripe pixels corresponding to the right eye are represented by hatched portions.

When the vertical width of the aperture portion of the mask pattern 9 is represented by $V_m$; the pitch (width) of each horizontal cylindrical lens of the horizontal lenticular lens 7, $V_L$; the focal length of each horizontal cylindrical lens of the horizontal lenticular lens 7 in the sheet surface of FIG. 5, $f_v$; the vertical width (pitch) of a stripe pixel displayed on the display device 4, $P_{V1}$; the converted distance between the display device 4 and the horizontal lenticular lens 7 (optical interval obtained by converting the distance between the display surface of the display device 4 and the principal point of the horizontal lenticular lens 7 on the side of the display device 4 into a value in the air), $L_{V1}$; and the converted distance between the horizontal lenticular lens 7 and the mask pattern 9 (optical interval obtained by converting the distance between the principal point of the horizontal lenticular lens 7 on the side of the mask pattern 9 and the mask pattern 9 into a value in the air), $L_{V2}$, this embodiment is set to satisfy the following equations:

$$P_{V1} : V_m = L_{V1} : L_{V2} \qquad (3)$$

$$P_{V1} : V_L = \frac{(L_{V1} + L_{V2})}{2} : L_{V2} \qquad (4)$$

$$\frac{1}{f_V} = \frac{1}{L_{V1}} + \frac{1}{L_{V2}} \qquad (5)$$

Equation (3) defines that the image of light from the aperture portion is formed on a corresponding image line (e.g., an image line for the right eye) on the display device 4. If this relationship has an error, the illumination light illuminates an image line (e.g., an image line for the left eye) which does not correspond to the aperture portion, resulting in crosstalk. Since the error of equation (3) is almost proportional to the crosstalk amount, the error of equation (3) is preferably smaller than the allowance of crosstalk, e.g., 5% or less.

Equation (4) defines that the image of light beams from a plurality of aperture portions corresponding to one eye (e.g., right eye) is formed on a plurality of corresponding image lines (e.g., image lines for the right eye) on the display device 4 independently of the cylindrical lenses of the horizontal lenticular lens through which the light beams are transmitted. If this relationship has an error, the position of an illumination line extending in the horizontal direction is cumulatively shifted in the vertical direction on the display device 4. Image lines (e.g., image lines for the left eye) which do not correspond to the aperture portions are illuminated at the upper and lower end of the screen, resulting in crosstalk. Errors in equation (4) are accumulated as the number of image lines increases. The allowance of the error changes depending on the number of pixels in the vertical direction of the screen. In a VGA display device, the number of pixels in the vertical direction is 480. When an illumination line can be shifted only by one line at the ends of 240th upper or lower pixels from the center, the allowance is about 1/240, i.e., only about 4%.

Equation (5) defines the focal length of the cylindrical lens for forming the image of the mask pattern on the display surface. A shift of the focal length $f_V$ blurs the illumination line, resulting in crosstalk. However, a light beam incident on each cylindrical lens of the lenticular lens is thin, and the increase in illumination line width due to defocusing is relatively small. When equations (3) and (4) hold, a light beam passing through the center of each cylindrical lens propagates to a predetermined position even when equation (5) has an error, so that the light beam is irradiated almost on the predetermined portion. The error allowance of equation (5) is about 15% for the numerical example shown in Table 1 (to be described later).

At this time, light beams from each aperture portion of the mask pattern 9 are condensed on a corresponding stripe pixel as a caustic curve perpendicular to the sheet surface of FIG. 5. Prominence is given to one aperture portion 8-1 of the aperture portions arranged in the checkerboard pattern. In FIG. 5, a light beam emerging from a point A at the center of the central aperture portion 8-1 and incident on a corresponding horizontal cylindrical lens 7-1 of the horizontal lenticular lens 7 is focused on a caustic curve on a point A' at the center of a corresponding stripe pixel 4-1 of the display device 4. Light beams emerging from the point A at the center of the aperture portion 8-1 and incident on horizontal cylindrical lenses, other than the horizontal cylindrical lens 7-1, of the horizontal lenticular lens 7, are focused on the centers of stripe pixels for the left eye, other than the stripe pixel 4-1, as caustic curves.

Light beams emerging from points B and C at the ends of the aperture portion 8-1 and incident on the horizontal cylindrical lens 7-1 are condensed on caustic curves at points B' and C' at the ends of the stripe pixel 4-1.

Light beams emerging from other points of the aperture portion 8-1 and incident on the horizontal cylindrical lens 7-1 are focused at corresponding positions on the stripe pixel 4-1 as caustic curves.

All light beams emerging from the aperture portion 8-1 and incident on horizontal cylindrical lenses other than the horizontal cylindrical lens 7-1 are also condensed on image lines for displaying the stripe pixels for the left eye on the display device 4.

In FIG. 5, all light beams emerging from aperture portions other than the aperture portion 8-1 of the mask pattern 9 are also focused on image lines for displaying stripe pixels for the left eye on the display device 4, illuminate the stripe pixels, are transmitted through the display device 4, and diverge only in the vertical direction in accordance with the NA in focusing. With this arrangement, when the eyes of the observer are set at a predetermined height, an observation region where the left and right images can be uniformly separately observed over the total vertical width of the screen can be obtained.

In FIG. 5, the aperture portions and stripe pixels associated with the left eye of the observer have been described. This embodiment has the same function as described above for the right eye of the observer.

To realize the vertical optical function of this embodiment, equations (3), (4), and (5) may be satisfied. The converted distance $L_{V2}$ between the horizontal lenticular lens 7 and the mask pattern 9 can be arbitrarily set. The vertical lenticular lens 3 can be arranged/set independently of the characteristics of the horizontal lenticular lens 7 as far as the vertical lenticular lens 3 does not physically interfere with the remaining members. When the vertical lenticular lens 3 is arranged close to the horizontal lenticular lens 7, the distance $L_{h2}$ between the mask pattern 9 and the vertical lenticular lens 3 can be arbitrarily increased. Therefore, as is apparent from equation (1), the width of a pair of an aperture portion and a shielding portion of the mask pattern 9 can be increased.

Figure 6:
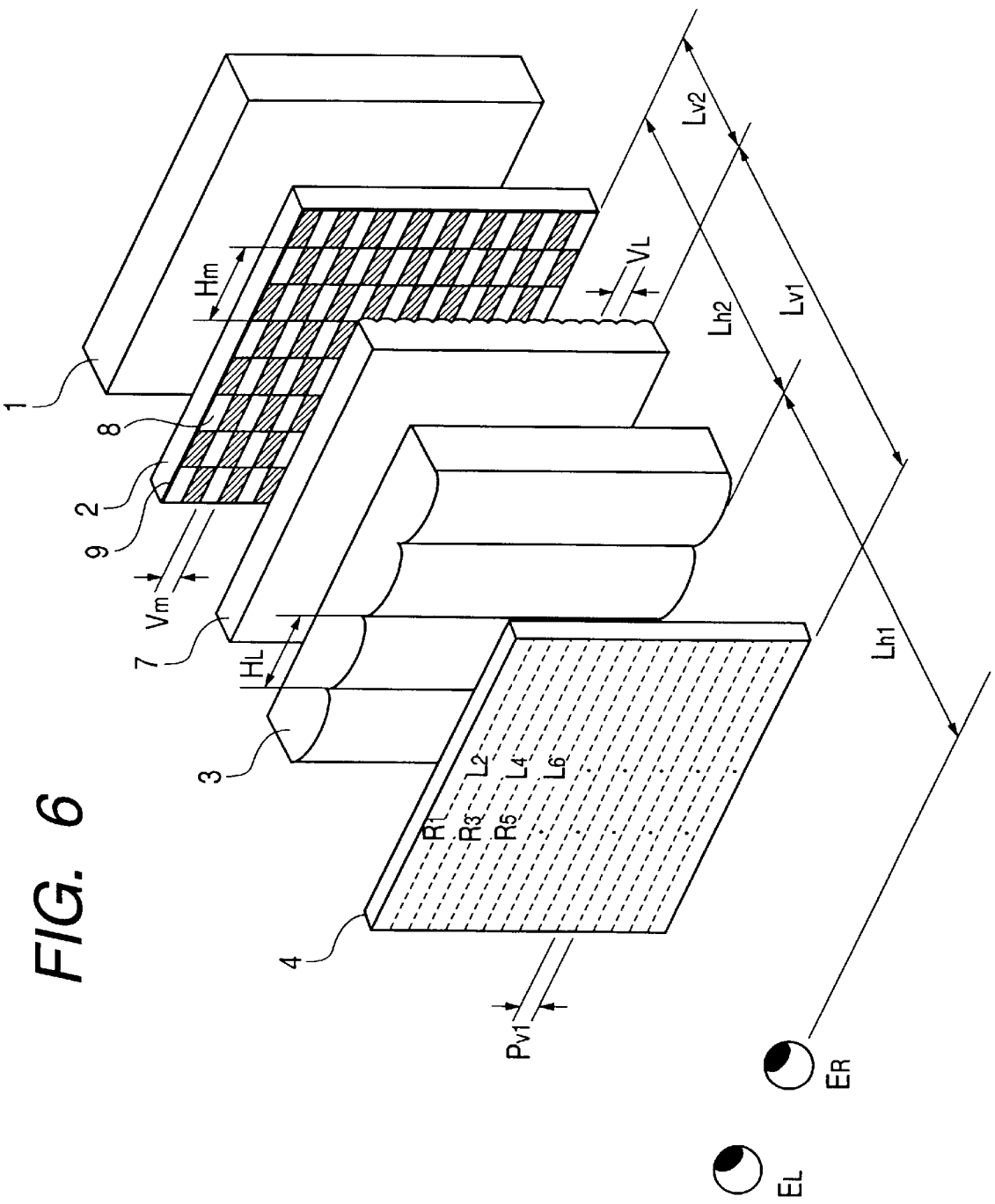
FIG. 6 is a schematic perspective view of a stereoscopic image display apparatus according to the third embodiment of the present invention.

FIG. 6 is a schematic perspective view of a stereoscopic image display apparatus according to the third embodiment of the present invention. The third embodiment is different from the second embodiment in the arrangement positions of a vertical lenticular lens 3 and a horizontal lenticular lens 7.

More specifically, the positions of the two lenticular lenses of the second embodiment are replaced.

In this embodiment as well, the specifications of members are set such that equations (1) to (5) described above are established. In addition, as in the second embodiment, the vertical optical function and the horizontal optical function are independent.

In the second embodiment, to increase a converted distance $L_{h2}$ between a mask pattern 9 and the vertical lenticular lens 3, both a converted distance $L_{v1}$ between the horizontal lenticular lens 7 and a display device 4 and a converted distance $L_{v2}$ between the horizontal lenticular lens 7 and the mask pattern 9 must be set to be larger than the converted distance $L_{h2}$. For this reason, the converted distance $(L_{v1}+L_{v2})$ between the mask pattern 9 and the display device 4 is larger than twice the distance $L_{h2}$, so that the apparatus tends to be thick.

In the third embodiment, the vertical lenticular lens 3 is separated from the mask pattern 9 by a distance larger than that between the mask pattern 9 and the horizontal lenticular lens 7. The converted distance between the mask pattern 9 and the display device 4 can be made almost equal to the converted distance $L_{h2}$ between the mask pattern 9 and the vertical lenticular lens 3, so that the thickness of the entire apparatus can be reduced.

As described above, in the present invention, when the apparatus is arranged to satisfy conditions (1) to (5) independently of the arrangement order of the vertical and horizontal lenticular lenses, the effect as described above can be obtained. This is because the vertical optical function and the horizontal optical function are independent, as described above.

Figure 7:
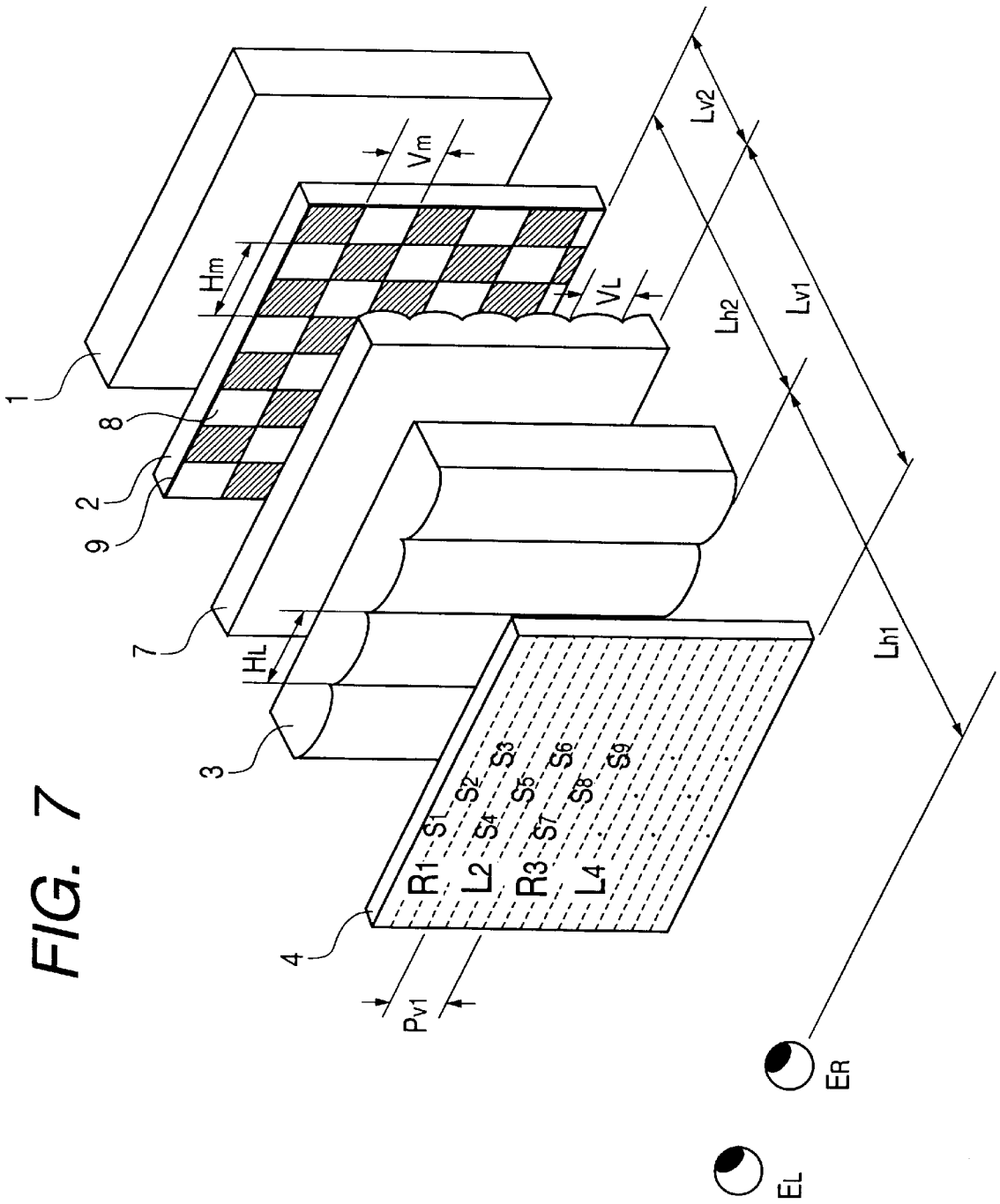
FIG. 7 is a schematic perspective view of a stereoscopic image display apparatus according to the fourth embodiment of the present invention.

FIG. 7 is a schematic perspective view of a stereoscopic image display apparatus according to the fourth embodiment of the present invention. In the third embodiment, the left and right parallax images are divided in units of scanning lines, a horizontal stripe image is combined and displayed on the display device 4, and light beams transmitted through the respective stripe pixels are made incident on the eyes of the observer.

In the fourth embodiment, the left and right parallax images are divided into stripe pixels by the width of a plurality of scanning lines (in this case, the width of three scanning lines). These stripe pixels are alternately arranged to combine the horizontal stripe image, and the horizontal stripe image is displayed on a display device 4. The principle of stereoscopic image display and the arrangement conditions of the apparatus are the same as those in the third embodiment, and a detailed description thereof will be omitted. Only different portions will be described below.

In this embodiment, the left and right parallax images are divided into stripe pixels by the width of three scanning lines on the display device 4. The left and right stripe pixels are alternately arranged from the upper end of the screen to combine a horizontal stripe image, and the horizontal stripe image is displayed on the display device 4. When the apparatus is constituted to satisfy conditions (1) to (5), a vertical width $P_{V1}$ of a stripe pixel becomes three times that of the above-described embodiments. For this reason, a vertical width $V_m$ of an aperture portion of a mask pattern 9 and a pitch $V_L$ of each horizontal cylindrical lens of a horizontal lenticular lens 7, which are determined from equations (3) and (4), respectively, can be increased relative to those of the above embodiments.

Since the pitches of the mask pattern 9 and the horizontal lenticular lens 7 can be increased, these optical elements can be easily manufactured, and the cost of the apparatus can be reduced.

Figure 8:
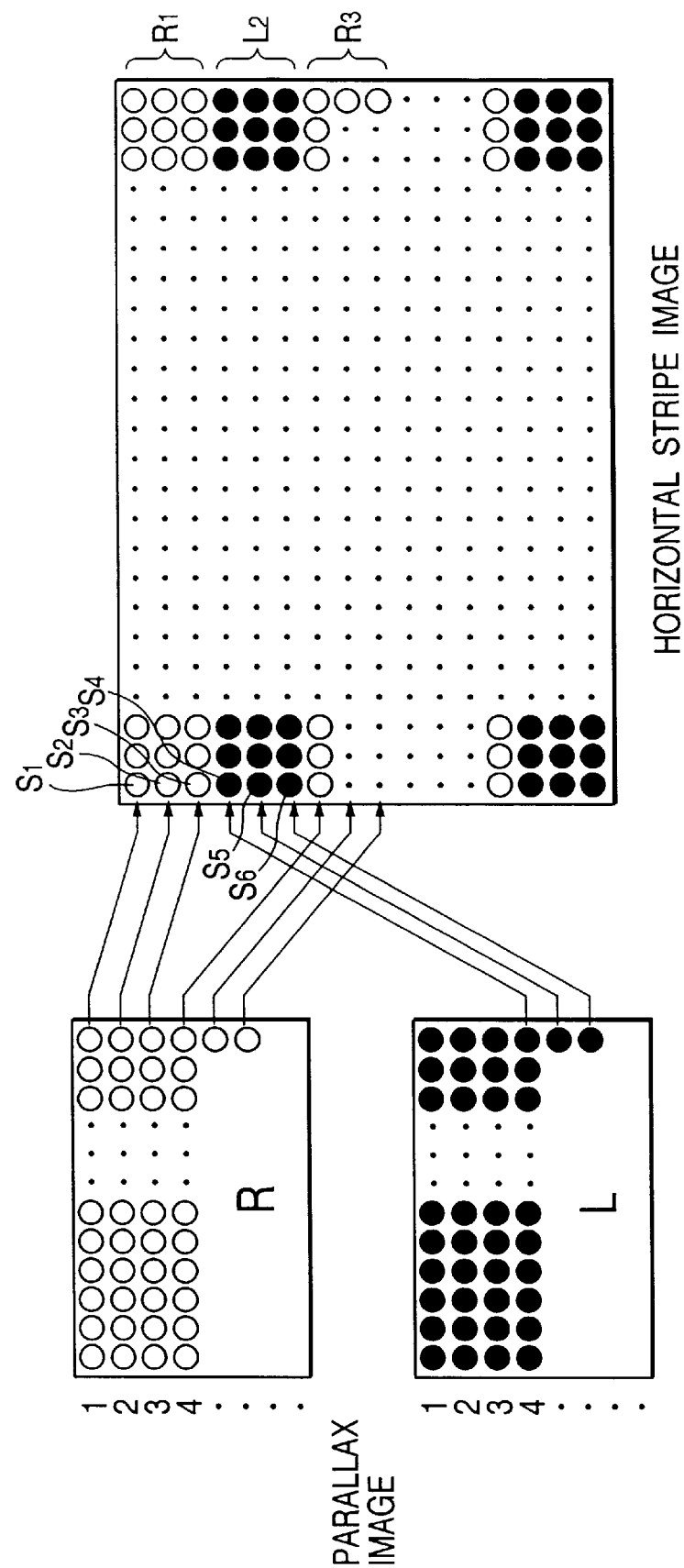
FIG. 8 is an explanatory view of the stripe image combining method of the fourth embodiment.

The horizontal stripe image displayed on the display device 4 in this embodiment will be described below in more detail. In this embodiment, as shown in FIG. 8, at least two parallax images R and L are divided into horizontal stripe pixels each having the width of three scanning lines by an image processing means 5 (not shown). Right stripe pixels $R_i$ prepared from the right parallax image R and left stripe pixels $L_i$ prepared from the left parallax image L, each of which has the width of three scanning lines, are alternately arranged. More specifically, a right stripe pixel $R_1$ is arranged at the position from a first scanning pixel $S_1$ to a third scanning pixel $S_3$, a left stripe image $L_2$ at the position from a fourth scanning pixel $S_4$ to a sixth scanning pixel $S_6$, a right stripe pixel $R_3$ at the position from a seventh scanning pixel $S_7$ to a ninth scanning pixel $S_9$, . . . to combine one horizontal stripe image (to be referred to as the first horizontal stripe image).

The image data of the horizontal stripe image prepared in the above manner is input to a display drive circuit 6 (not shown). The horizontal stripe image is displayed on the display device 4, so that a stereoscopic image can be displayed on the basis of the same principle as described above.

In this embodiment as well, the left and right stripe pixels may be replaced and arranged in the order of $L_1, R_2, L_3, R_4, L_5, R_6, L_7, \ldots$ to combine a second horizontal stripe image, as described in FIG. 3. In this case, a mask pattern having aperture portions and shielding portions which are complementary to those of the mask pattern 9 used for the first horizontal stripe image $(R_1, L_2, R_3, L_4, R_5, L_6 \ldots)$ shown in FIG. 7 may be used.

Figure 9:
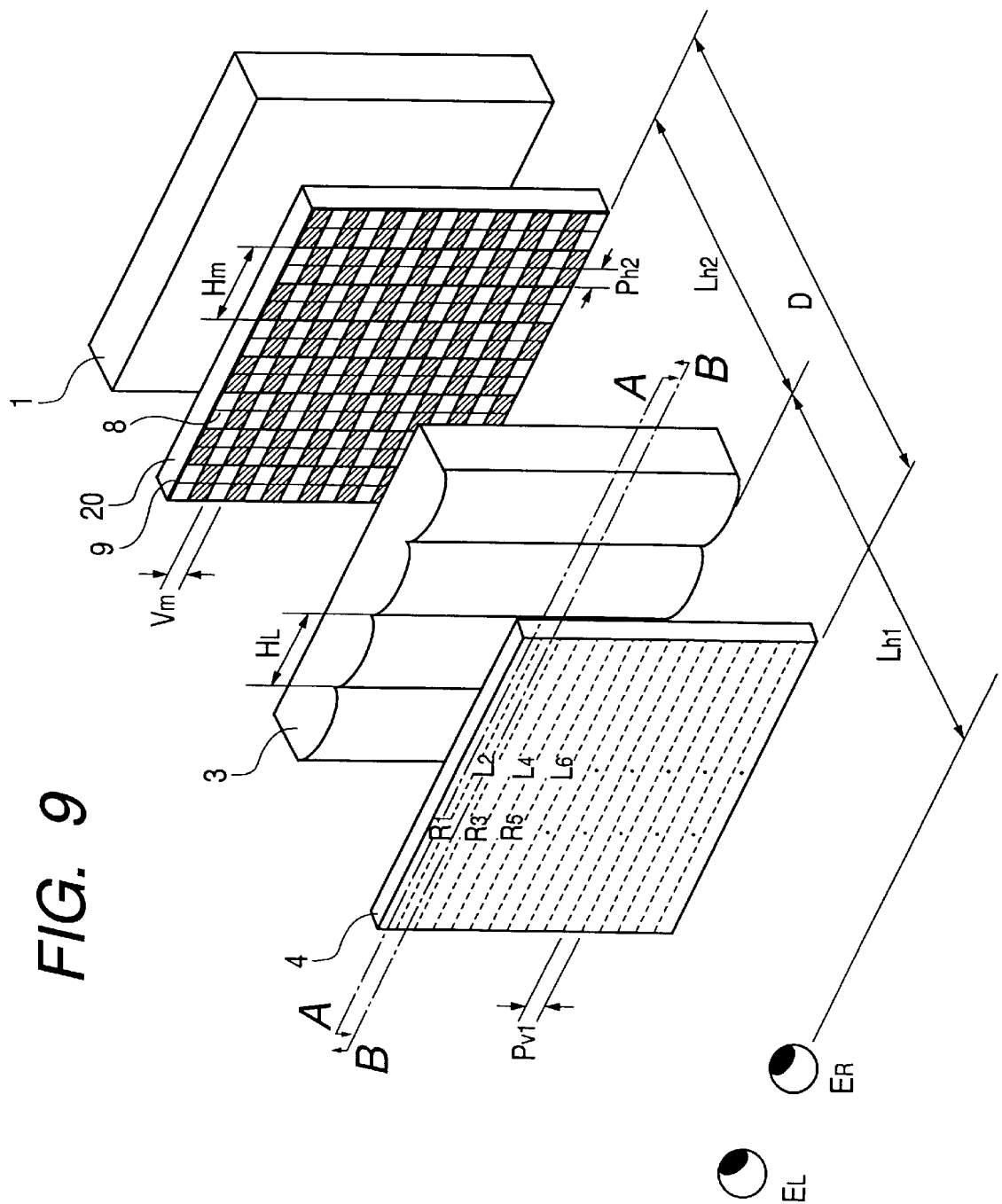
FIG. 9 is a schematic perspective view of a stereoscopic image display apparatus according to the fifth embodiment of the present invention.

FIG. 9 is a schematic perspective view of a stereoscopic image display apparatus according to the fifth embodiment of the present invention. In this embodiment, the mask 2 of the first embodiment is changed to an optical modulator, and a mask pattern is formed on the display surface of the optical modulator. The remaining arrangements are the same as those of the first embodiment. Different points will be mainly described below.

Referring to FIG. 9, an optical modulator 20 has a discrete pixel structure. The optical modulator 20 is constituted by a monochromatic transmission type liquid crystal display element, and a mask pattern 9 having a number of rectangular aperture portions is formed on the display surface of the optical modulator 20. The mask pattern 9 is illuminated with a backlight source 1. The optical modulator 20 and the backlight source 1 constitute a light source means.

In this embodiment as well, a horizontal stripe image formed from stripe pixels each having the width of one scanning line is displayed on a display device 4, as in the first embodiment. Light beams from the backlight source 1 are transmitted through aperture portions 8 (blank portions in FIG. 9) of the mask pattern 9 formed on the optical modulator 20 and illuminate the display device 4 through a vertical lenticular lens (vertical cylindrical lens array) 3. The light beams are separated into light beams having information of right stripe pixels and light beams having information of left stripe pixels and condensed on predetermined regions, so that the left and right parallax images are separately observed with the eyes of the observer, which are located in these regions.

Figure 10:
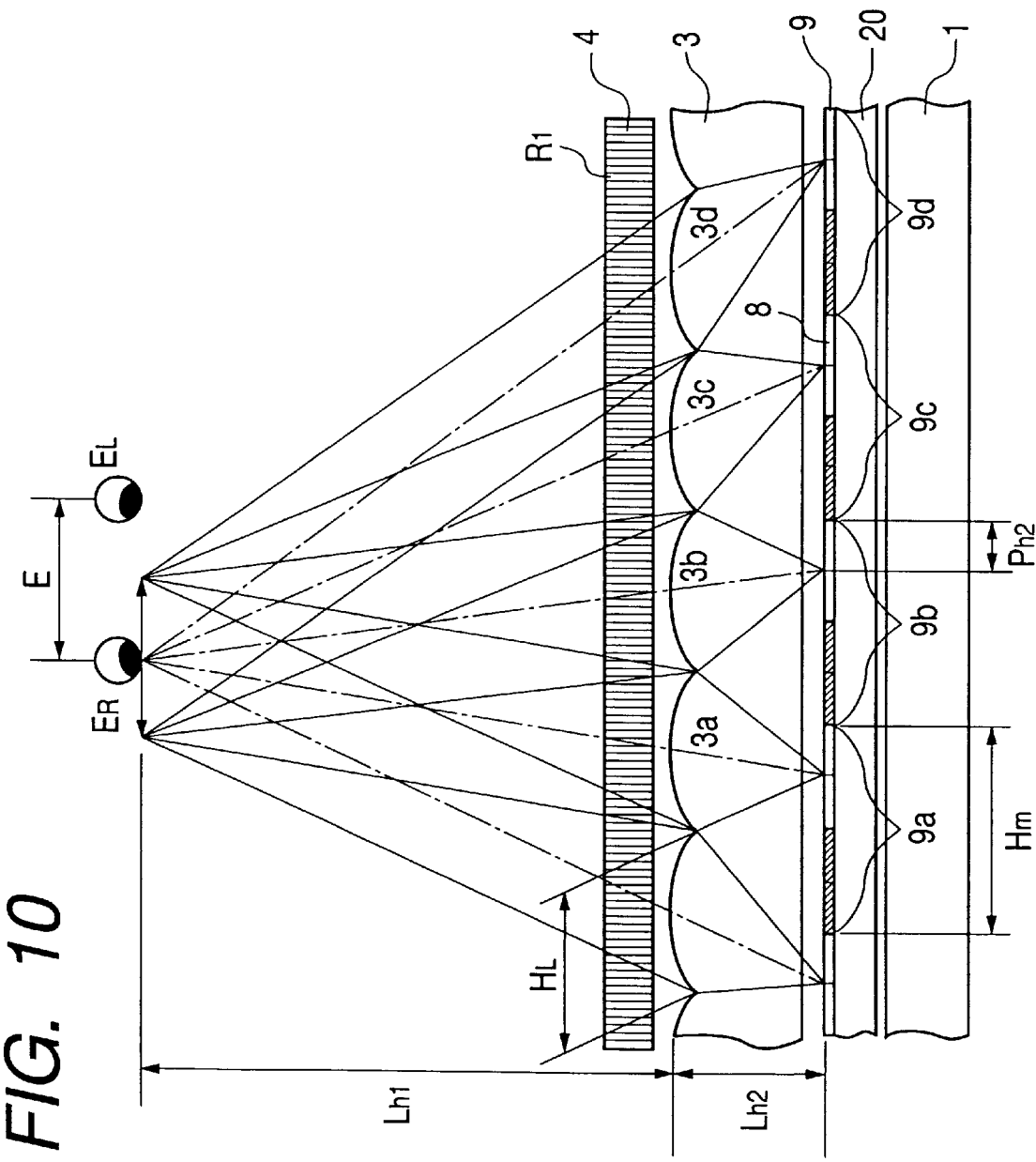
FIG. 10 is a sectional view for explaining the function of the horizontal section of the fifth embodiment.

FIG. 10 is a sectional view for explaining the function of the horizontal section of the fifth embodiment. The principle that the left and right parallax images are separated in the horizontal direction and observed by the eyes of the observer will be described with reference to FIG. 10. The optical modulator 20 is illuminated with the backlight source 1, and light beams emerge from the aperture portions 8. The lens curvature of the vertical lenticular lens 3 is set such that the mask pattern 9 is located nearly at the focal position of each vertical cylindrical lens of the vertical lenticular lens 3. The mask pattern 9 need not be strictly located at the focal position of each vertical cylindrical lens and may be set within a range where light beams emerging from the aperture portions to form the left and right image regions do not mix at the observation position to cause crosstalk. A horizontal width (pitch) $H_m$ of a pair of an aperture portion and a shielding portion arranged in the horizontal direction on the mask pattern 9 corresponds to a pitch $H_L$ of a vertical cylindrical lens of the vertical lenticular lens 3.

The pattern of the aperture portion and the shielding portion shown in FIG. 10 corresponds to a right stripe pixel of the horizontal stripe image displayed on the display device 4. Light beams emerging from the aperture portions 8 are transmitted through the vertical lenticular lens 3 and illuminate the right stripe pixel with directivity in the range indicated by solid lines in FIG. 10.

$E_R$ in FIG. 10 represents the right eye of the observer. As in the first embodiment, to uniformly focus light beams from the plurality of aperture portions 8 to the right eye over the total width of the screen, when the horizontal width of one vertical cylindrical lens of the vertical lenticular lens 3 is represented by $H_L$; the width (pitch) of a pair of an aperture portion and a shielding portion arranged in the horizontal direction on the mask pattern 9, $H_m$; a converted distance between the mask pattern 9 and the vertical lenticular lens 3, $L_{h2}$; a converted distance from a predetermined observer position to the vertical lenticular lens 3, $L_{h1}$; and a predetermined distance between the eyes of the observer, E, equations (1) and (2) hold among these specifications.

As a result, the right stripe pixels of the horizontal stripe image displayed on the display device 4 are observed only within a range indicated by an arrow, where the right eye $E_R$ is present.

For a left eye $E_L$, the pattern of the aperture portions and the shielding portions of the mask pattern 9 is reversed to that shown in FIG. 10, so that the aperture portions and the shielding portions correspond to a left stripe pixel in the horizontal stripe image displayed on the display device 4. Light beams transmitted through the vertical lenticular lens 3 and the left stripe pixels are focused with directivity on a region shifted by the distance E between the eyes in the horizontal direction from the region where light beams for illuminating the right stripe pixels are condensed.

As a result, the left and right stripe pixels are separated into the left and right eyes in the horizontal direction and observed. The left parallax image is observed by the left eye, and the right parallax image is observed by the right eye as sets of stripe pixels, so that a stereoscopic image can be observed.

In FIG. 10, the distance along the front-and-rear direction from the apparatus to the observer is reduced and emphasized to describe the stereoscopic image displaying method of this embodiment (the distance $L_{h2}$ is illustrated at a ratio much larger than that of the distance $L_{h1}$). For this reason, the pitch $H_m$ is illustrated to be much larger than the pitch $H_L$. Actually, since the converted distance $L_{h2}$ is much smaller than the converted distance $L_{h1}$, the pitch $H_m$ becomes slightly larger than the pitch $H_L$ in accordance with equation (2).

In FIG. 10, $P_{h2}$ represents the horizontal size of one pixel of the optical modulator 20. In this embodiment, four pixels of the optical modulator 20 constitute a pair of an aperture portion and a shielding portion. Four pixels 9a of the optical modulator 20 correspond to a vertical cylindrical lens 3a of the vertical lenticular lens 3. Four pixels 9b and 9c of the optical modulator 20 correspond to vertical cylindrical lenses 3b and 3c, respectively.

Figure 11:
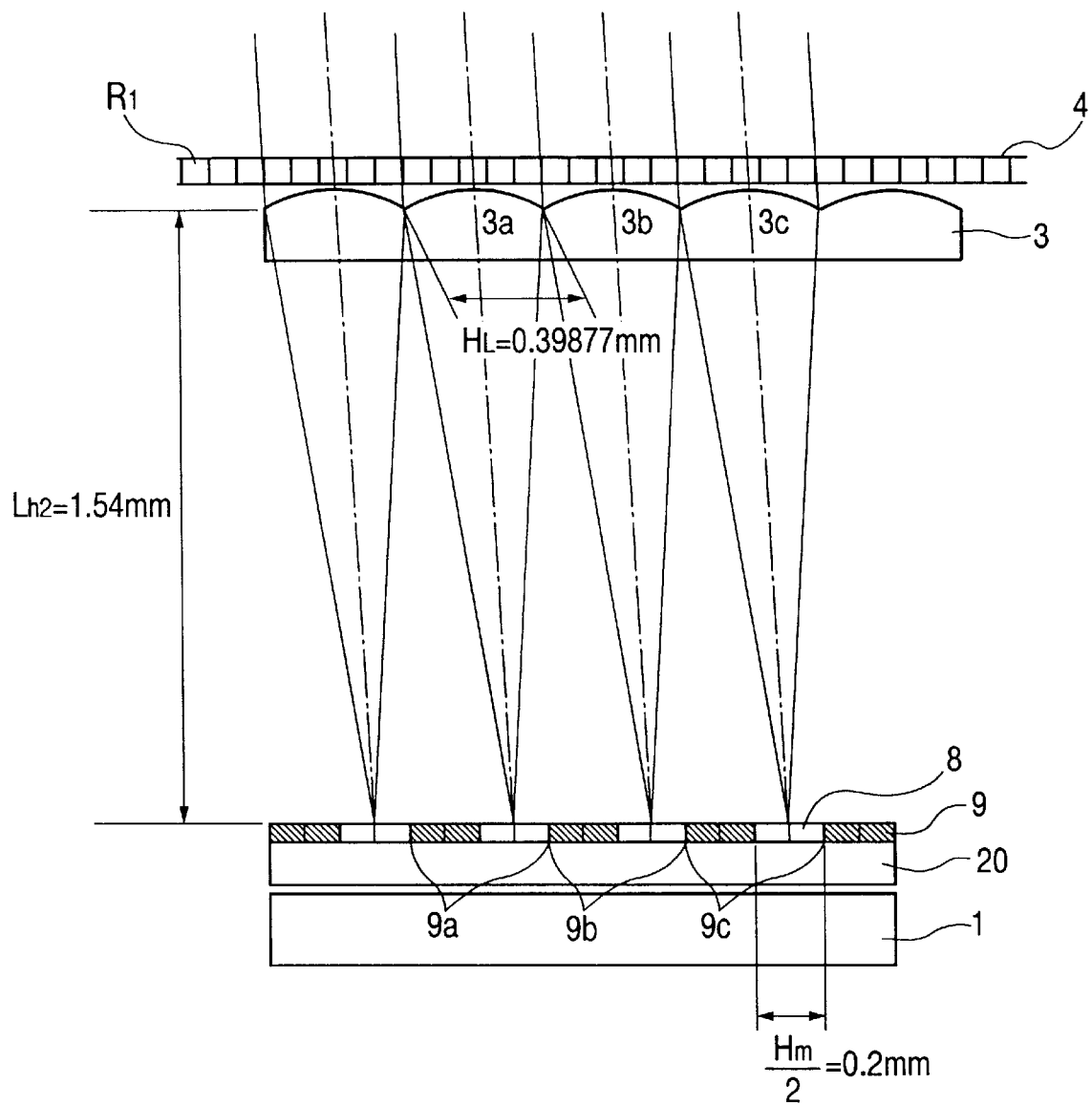
FIG. 11 is a sectional view for explaining the horizontal section of the fifth embodiment.
Figure 12:
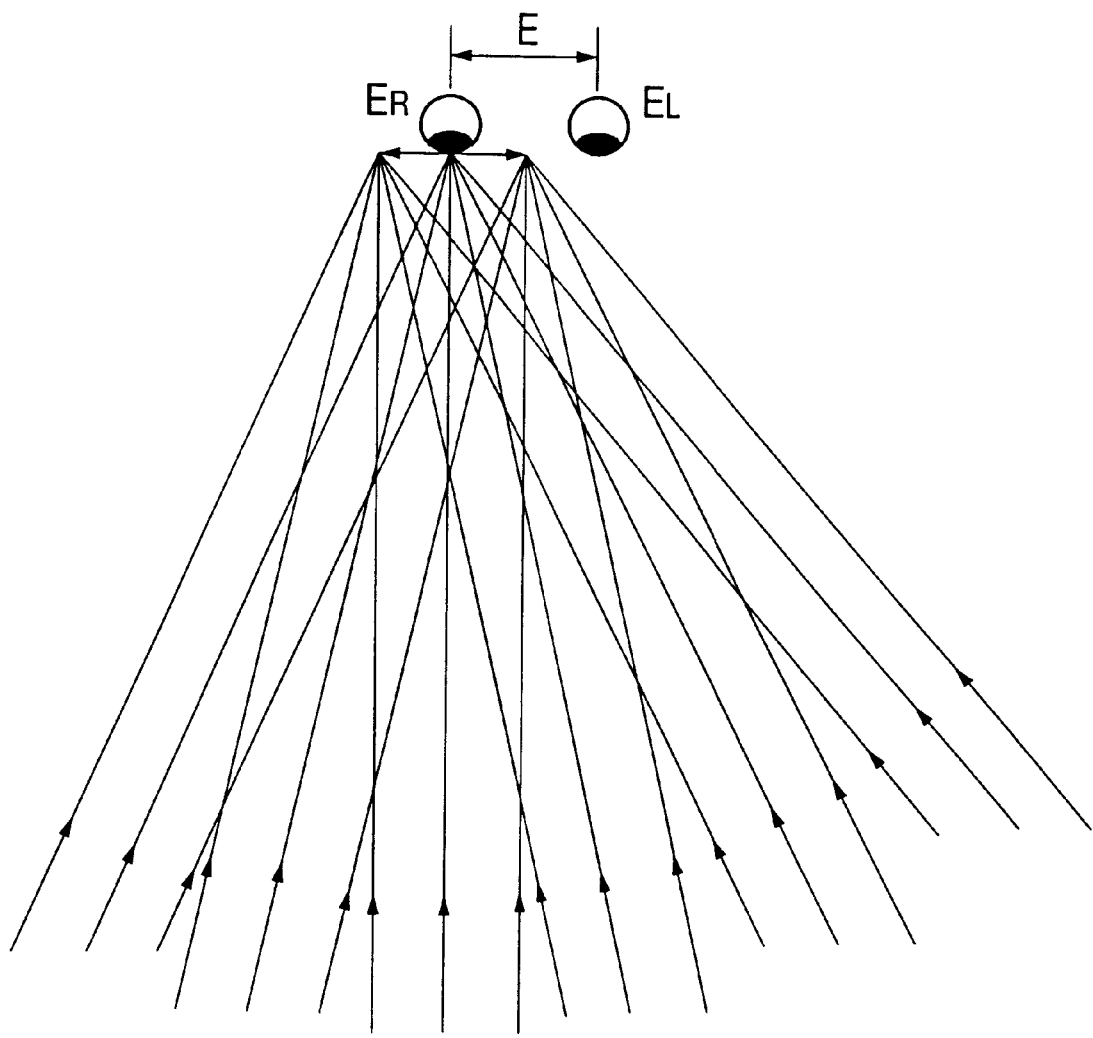
FIG. 12 is a view for explaining focusing of light beams near the observation plane in the fifth embodiment.

FIG. 11 is a sectional view of the display unit and light beams, which are illustrated at a ratio close to the actual design values. FIG. 12 is a view for explaining focusing of light beams near the observation plane. The same reference numerals as in FIG. 10 denote the same members in FIG. 11. In FIG. 11 as well, the four pixels 9a of the optical modulator 20 correspond to the vertical cylindrical lens 3a of the vertical lenticular lens 3, and the four pixels 9b and 9c of the optical modulator 20 correspond to the cylindrical lenses 3b and 3c, respectively.

The vertical lenticular lens 3 has a lot of vertical cylindrical lenses arranged in the horizontal direction in addition to the vertical cylindrical lenses 3a to 3c. Each vertical cylindrical lens corresponds to a pair of an aperture portion formed by two pixels and a shielding portion formed by two pixels, i.e., a total of four pixels. Directivity is given to light beams from the aperture portions by the vertical cylindrical lenses such that the light beams are condensed on the right-eye region of the observation plane.

FIG. 12 shows a state wherein light beams to which directivity is given by the vertical lenticular lens 3 are focused on the region where the right eye $E_R$ of the observer is present on the observation plane. Right stripe pixels constituting the horizontal stripe image displayed on the display device 4 are observed only within a range indicated by an arrow where the right eye $E_R$ is present.

FIG. 13 is a sectional view for explaining the function of the vertical section of this embodiment. The observation region in the vertical direction will be described with reference to FIG. 13. The aperture portions formed on the optical modulator 20 are arranged in a checkerboard pattern, as shown in FIG. 9. The aperture portions correspond, in the vertical direction, to right stripe pixels or left stripe pixels of the horizontal stripe image displayed on the display device 4. All the plurality of aperture portions 8 shown in FIG. 13 correspond to right stripe pixels.

In FIG. 13, $P_{V2}$ represents the vertical pixel size of the optical modulator. The aperture portion 8 is set to an appropriate aperture ratio in one pixel using a non-transmission portion of a black matrix or the like. The vertical pixel size $P_{V2}$ of the optical modulator 20 is slightly larger than a vertical width $P_{V1}$ of a stripe pixel of the horizontal stripe image. The observer separated from the display device 4 by a predetermined observation distance can observe corresponding aperture portions through stripe pixels displayed on the display device 4. Therefore, when the eyes of the observer are set at a predetermined height, an observation region where the left and right images can be uniformly separately observed over the total vertical width of the screen can be obtained.

A vertical width $V_m$ of the aperture portion 8 of the mask pattern 9 is made smaller than the vertical width $P_{V1}$ of a stripe pixel, and the vertical width $V_m$ of the shielding portion 8 is made smaller than a vertical width $V_m'$ of a shielding portion. Even when the observer moves in the vertical direction, and the relative positions of stripe pixels and corresponding aperture portions are slightly shifted, light beams from the corresponding aperture portions never illuminate neighboring stripe pixels. For this reason, the observation region in the vertical direction can be extended to the range indicated by an arrow shown in FIG. 13.

The above function can be realized by constituting each of the aperture portions and the shielding portions of the mask pattern 9 by one pixel of the optical modulator 20 along the vertical direction and setting the vertical width $P_{V2}$ of a pixel of the optical modulator 20 to be slightly larger than the vertical width $P_{V1}$ of a stripe pixel displayed on the display device 4 to adjust the vertical aperture ratio of the pixels of the optical modulator 20.

Normally, an LCD has polarizing plates for limiting the direction of polarization on the light incident and exit sides. In this embodiment, two LCDs, i.e., the display device 4 and the optical modulator 20 overlap. Hence, the polarizing plate on the exit side of the optical modulator 20 or the polarizing plate on the incident side of the display device 4 can be omitted.

A function of changing the observation position by changing the mask pattern 9 to be displayed on the optical modulator 20 will be described next. The horizontal pixel size of the display device 4 is represented by $P_{h1}$; the vertical width of the stripe pixel, $P_{V1}$; the horizontal pixel size of the optical modulator 20, $P_{h2}$; and the vertical pixel, $P_{V2}$.

The horizontal width of the aperture portion 8 or the shielding portion of the mask pattern 9 is $H_m/2$. The width $H_m/2$ is set to be an integer multiple of the horizontal pixel size $P_{h2}$ of the optical modulator 20. The region illuminated with light beams transmitted through the left and right stripe pixels on the observation plane is formed by projecting the aperture portions 8 formed on the optical modulator 20. When the positions of the aperture portions 8 of the mask pattern 9 are moved in the left or right direction, the region illuminated with light beams transmitted through the left and right stripe pixels on the observation plane (region where light beams having information of the right stripe pixels and light beams having information of the left stripe pixels separately focus) moves in the left or right direction.

Figure 14A:
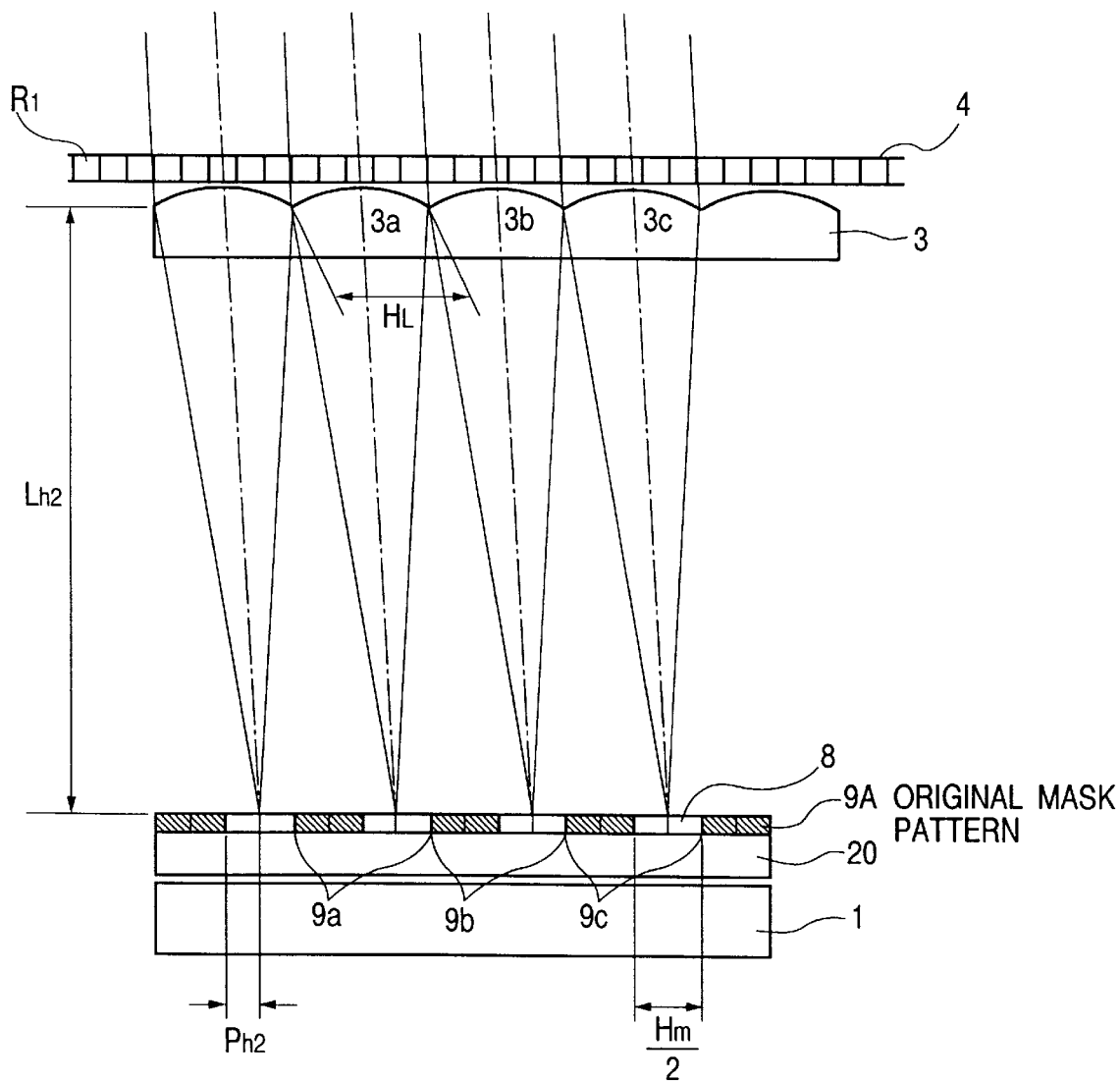
FIGS. 14A and 14B are sectional views for explaining a function of moving a stereoscopic image region in the horizontal direction in the fifth embodiment.
Figure 14B:
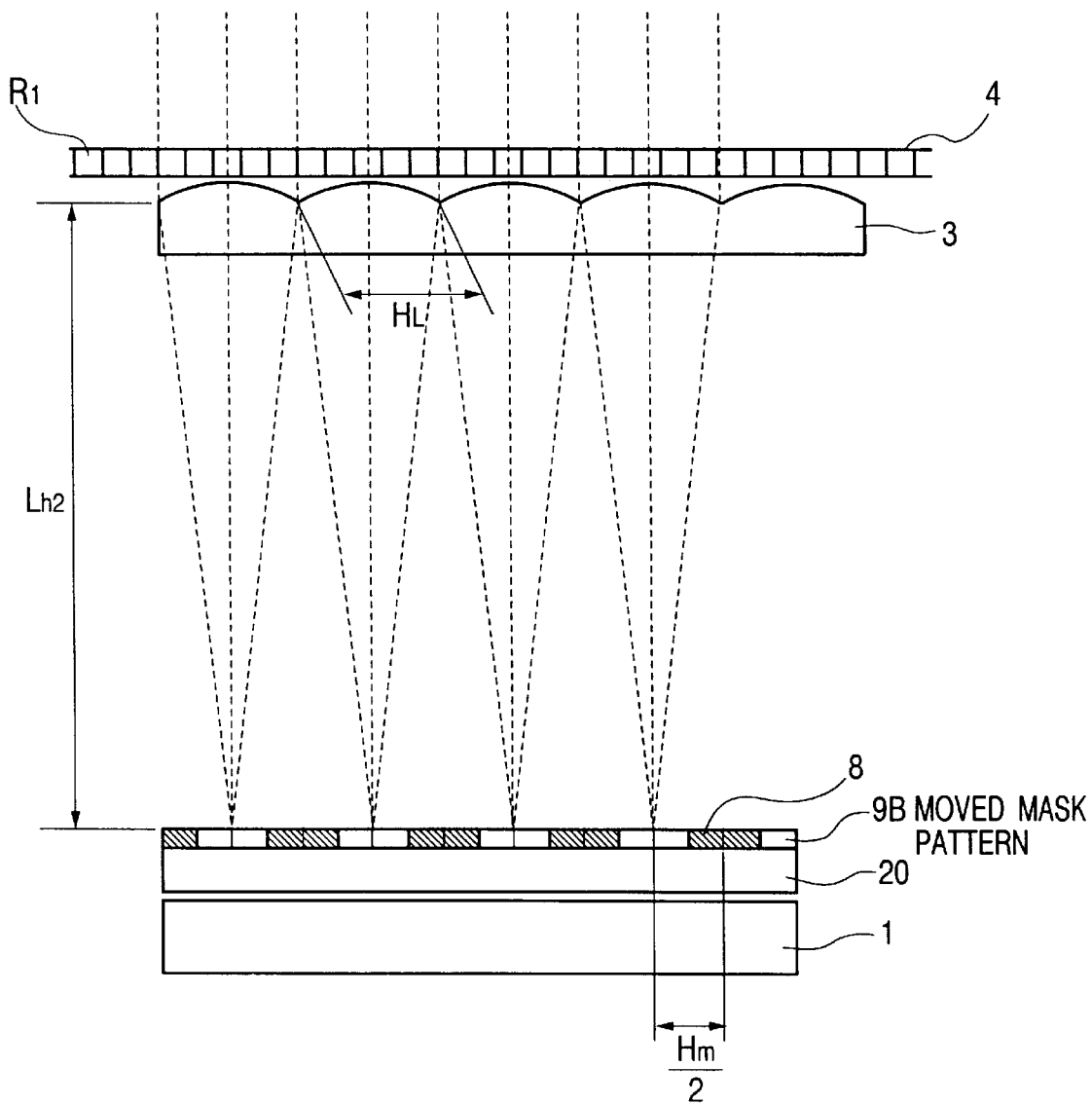
Figure 15:
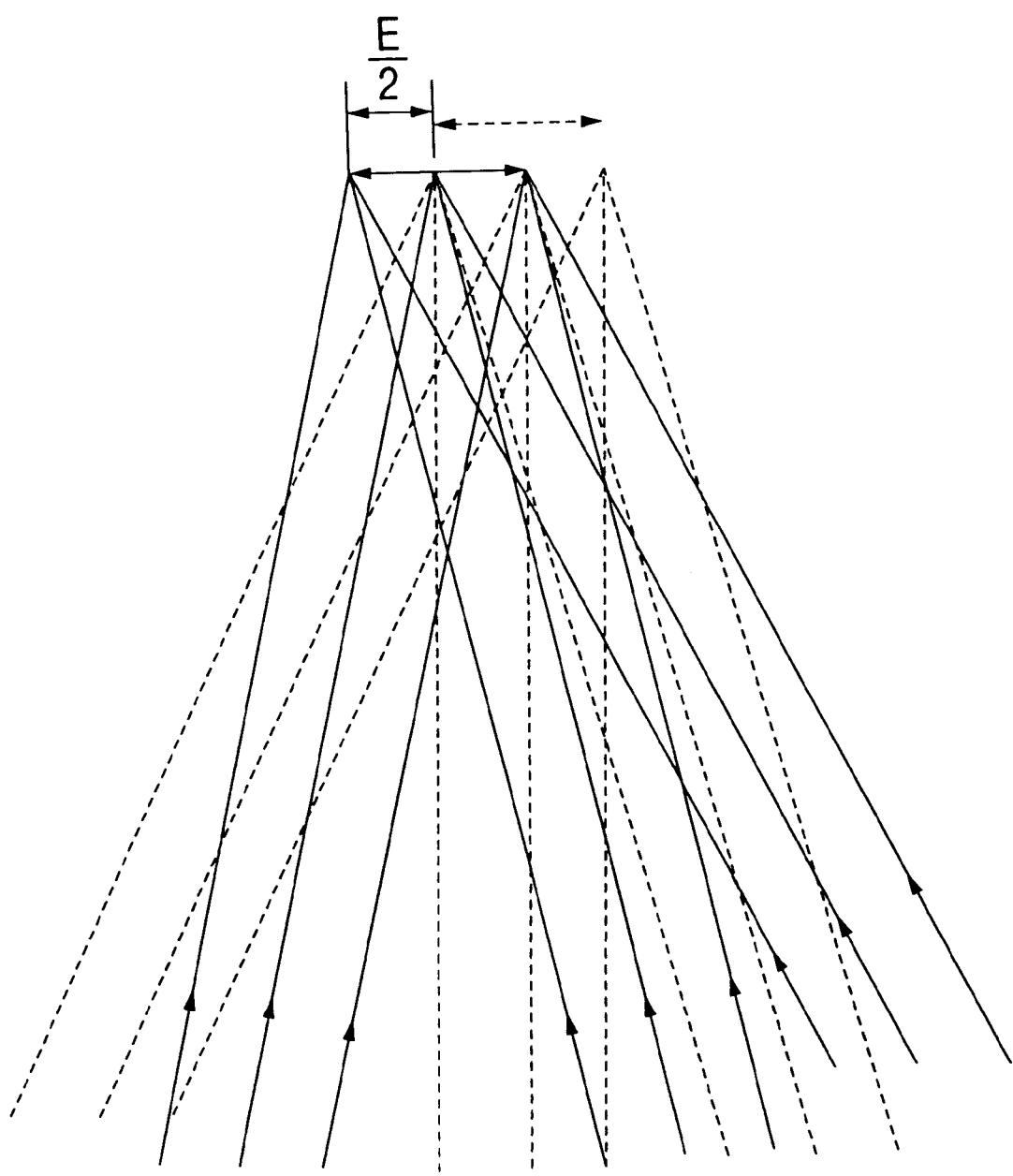
FIG. 15 is a view showing movement of light beams near the observation plane in the fifth embodiment.

FIGS. 14A, 14B, and 15 are views for explaining this function. FIGS. 14A and 14B are horizontal sectional views in which this embodiment is illustrated at a ratio close to the actual design values, as in FIG. 11. A pair of an aperture portion and a shielding portion are formed by four pixels of the optical modulator 20. FIG. 15 shows a state wherein light beams to which directivity is given by the vertical lenticular lens 3 are focused on the observation plane.

As shown in FIGS. 14A and 14B, $H_m = 4 \cdot P_{h2}$. To satisfy equation (1), the converted distance $L_{h2}$ between the vertical lenticular lens 3 and the optical modulator 20 (optical distance obtained by converting the distance from the principal point of the vertical lenticular lens 3 on the side of the optical modulator 20 to the display surface of the optical modulator 20 into a value in the air) is set as follows:

$$L_{h2} = 2 \cdot P_{h2} \cdot L_{h1}/E \qquad (7)$$

The four pixels 9a of the optical modulator 20 correspond to the vertical cylindrical lens 3a of the vertical lenticular lens 3, and the four pixels 9b and 9c of the optical modulator 20 correspond to the cylindrical lenses 3b and 3c, respectively.

FIG. 14A shows the initial observation state. In FIG. 14B, all the aperture portions of the mask pattern 9 on the optical modulator 20 are moved to the left in the horizontal direction by the width $P_{h2}$ of one pixel from the state shown in FIG. 14A. In accordance with this movement, the region illuminated with light beams transmitted through the left and right stripe pixels on the observation plane moves in the horizontal direction as a whole by ½ the distance E between the eyes, i.e., E/2. In FIG. 15, light beams from the aperture portions when the mask pattern on the optical modulator 20 is set in the initial state shown in FIG. 14A are indicated by solid lines, and light beams from the aperture portions when the mask pattern is set in the state shown in FIG. 14B are indicated by broken lines.

To form one aperture portion of the optical modulator 20 by a larger number of pixels, the converted distance $L_{h2}$ between the vertical lenticular lens 3 and the optical modulator 20 may be set at a larger value. The observation region can be finely moved in accordance with the number of pixels of one aperture portion.

More specifically, when each of an aperture portion and a shielding portion is constituted by k pixels, the observation region can be moved in the horizontal direction using E/k as a unit of movement. At this time, the converted distance $L_{h2}$ must be set in accordance with equation (8) below:

$$L_{h2} = k \cdot P_{h2} \cdot L_{h1}/E \qquad (8)$$

In this arrangement, the horizontal pixel size $P_{h1}$ of the display device 4 and the horizontal pixel size $P_{h2}$ of the optical modulator 20 are not directly related to each other. When the converted distance $L_{h2}$ between the optical modulator 20 and the vertical lenticular lens 3 is set to be large, the horizontal pixel size $P_{h2}$ of the optical modulator 20 can be set to be equal to or larger than the horizontal pixel size $P_{h1}$ of the display device 4. Therefore, the observation region can be smoothly moved in the left or right direction using a smaller unit than the distance between the eye without using any specially precise liquid crystal element as the optical modulator 20.

Table 1 shows an actual numerical example.

TABLE 1

| | |
|---|---|
| $H_m$ | the horizontal width of a pair of an aperture portion and a shielding portion arranged on the mask pattern in the horizontal direction |
| $H_L$ | the pitch of each vertical cylindrical lens of the vertical lenticular lens |
| $L_{h1}$ | the converted distance between the observer and the vertical lenticular lens |
| $L_{h2}$ | the converted distance between the vertical lenticular lens and the mask pattern |
| $P_{h1}$ | the horizontal pixel size of the display device |
| $P_{h2}$ | the horizontal pixel size of the optical modulator |
| $f_h$ | the focal length of each vertical cylindrical lens of the vertical lenticular lens in the horizontal section |
| E | the interval of light beams separated at the observation position in the horizontal direction, which have been transmitted through the left and right stripe pixels |
| m | the number of horizontal pixels of the optical modulator, which constitute one aperture portion or one shielding portion |

| $L_{h1}$ | $L_{h2}$ | $P_{h1}$ | $P_{h2}$ | m | $f_h$ | $H_m$ | $H_L$ |
|---|---|---|---|---|---|---|---|
| 500 mm | 1.5385 mm | 0.1 mm | 0.1 mm | 2 pixels | 1.5385 mm | 0.4 mm | 0.39877 mm |

Movement amount of the observation region in accordance with horizontal movement of one pixel of the aperture portion (E/m) = 32.5 mm The above-described FIG. 11 is a plan view in which the structure near the optical modulator 20 and the vertical lenticular lens 3 is illustrated almost at the actual ratio in this numerical example, and corresponds to FIGS. 10, 14A, and 14B. In this case, the pitch $H_L$ of the vertical cylindrical lens and the width $H_m$ of a pair of an aperture portion and a shielding portion formed on the optical modulator 20 in the horizontal direction hardly change.

The horizontal stripe image displayed on the display device 4 may be combined by alternately arranging the right stripe pixels and the left stripe pixels in units of scanning lines, or stripe pixels corresponding to the width of a plurality of scanning lines may be combined.

In place of the backlight source 1 and the optical modulator 20, a self-emission type display element such as a CRT or a fluorescent indicator tube may be used as a light source means. The same light emission pattern as the mask pattern can be formed using light-emitting portions and non-emitting portions, and directivity can be given to the patterned exit light by the vertical lenticular lens 3. In this case as well, the horizontal pixel size $P_{h2}$ of the self-emission type display element can be selected independently of the horizontal pixel size $P_{h1}$ of the display device 4. In addition, when the light-emitting portions of the light emission pattern formed in the self-emission type display element are moved in the left or right direction, the observation region can be moved in the horizontal direction as in the fifth embodiment. When the converted distance $L_{h2}$ between the light-emission surface of the self-emission type display element and the vertical lenticular lens is set to be large, the observation region can be smoothly moved in the left or right direction using a smaller unit than the distance between the eyes even when the horizontal pixel size $P_{h2}$ of the self-emission type display element is set to be large.

Figure 16:
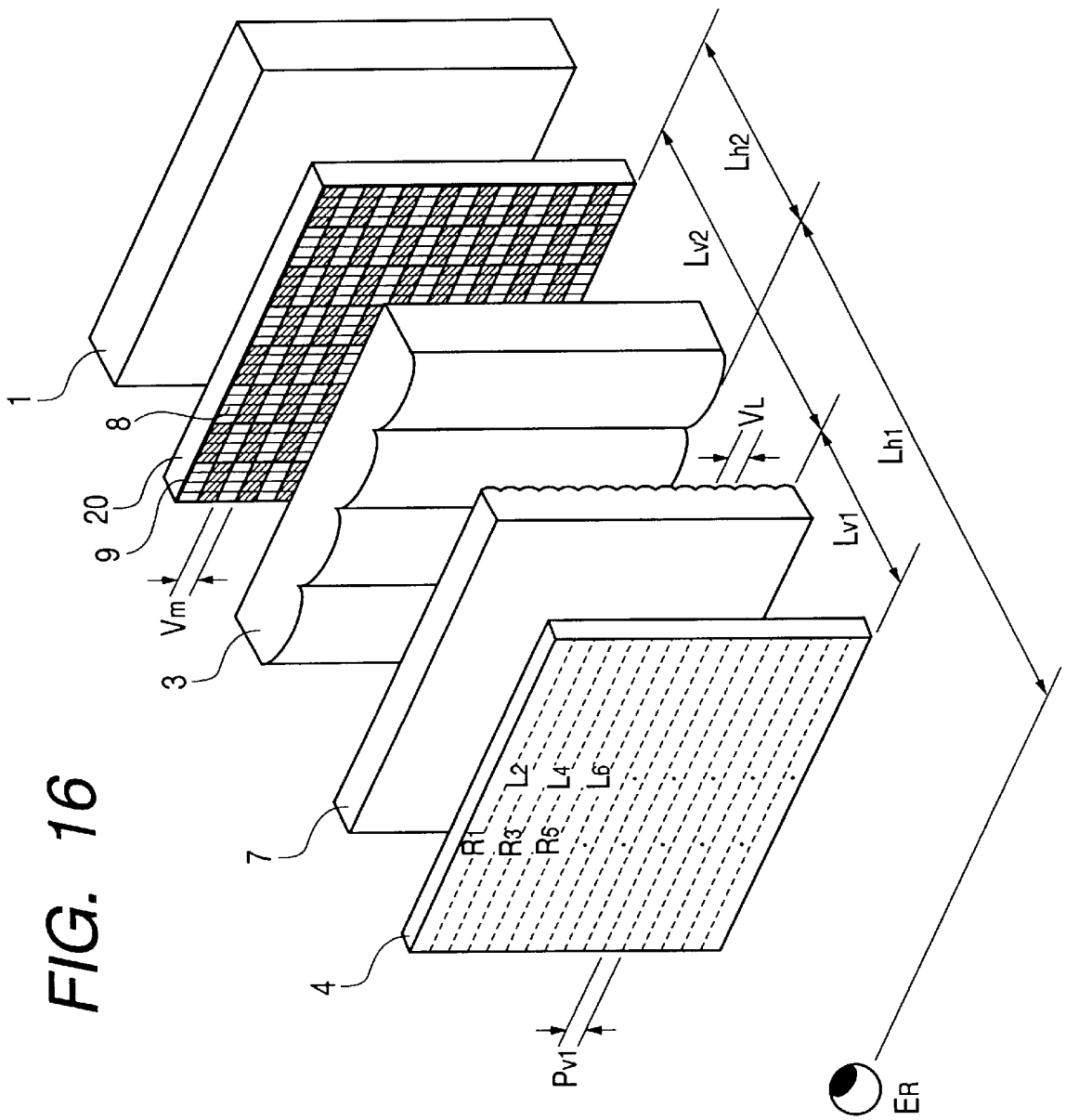
FIG. 16 is a schematic perspective view of a stereoscopic image display apparatus according to the sixth embodiment of the present invention.

FIG. 16 is a schematic perspective view of a stereoscopic image display apparatus according to the sixth embodiment of the present invention. The sixth embodiment is different from the second embodiment only in that the mask 2 of the second embodiment is changed to an optical modulator, and a mask pattern is formed on the display surface of the optical modulator. The remaining arrangements are the same as those of the second embodiment. In this embodiment, a horizontal lenticular lens (horizontal cylindrical lens array) 7 is arranged between a vertical lenticular lens 3 and a display device 4 of the fifth embodiment.

The horizontal lenticular lens 7 is formed by arranging, in the vertical direction, a number of cylindrical lenses each having a generatrix in the horizontal direction. The function associated with the horizontal direction is the same as in the fifth embodiment because the horizontal lenticular lens 7 has no optical power in the horizontal direction. The same stripe image as in the fifth embodiment is displayed on the display device 4. Light beams from a backlight source 1 are transmitted through aperture portions 8 of the mask pattern formed on an optical modulator 20 and illuminate the display device 4 through the vertical lenticular lens 3, so that left and right parallax images are separately observed with the eyes of the observer.

Figure 17:
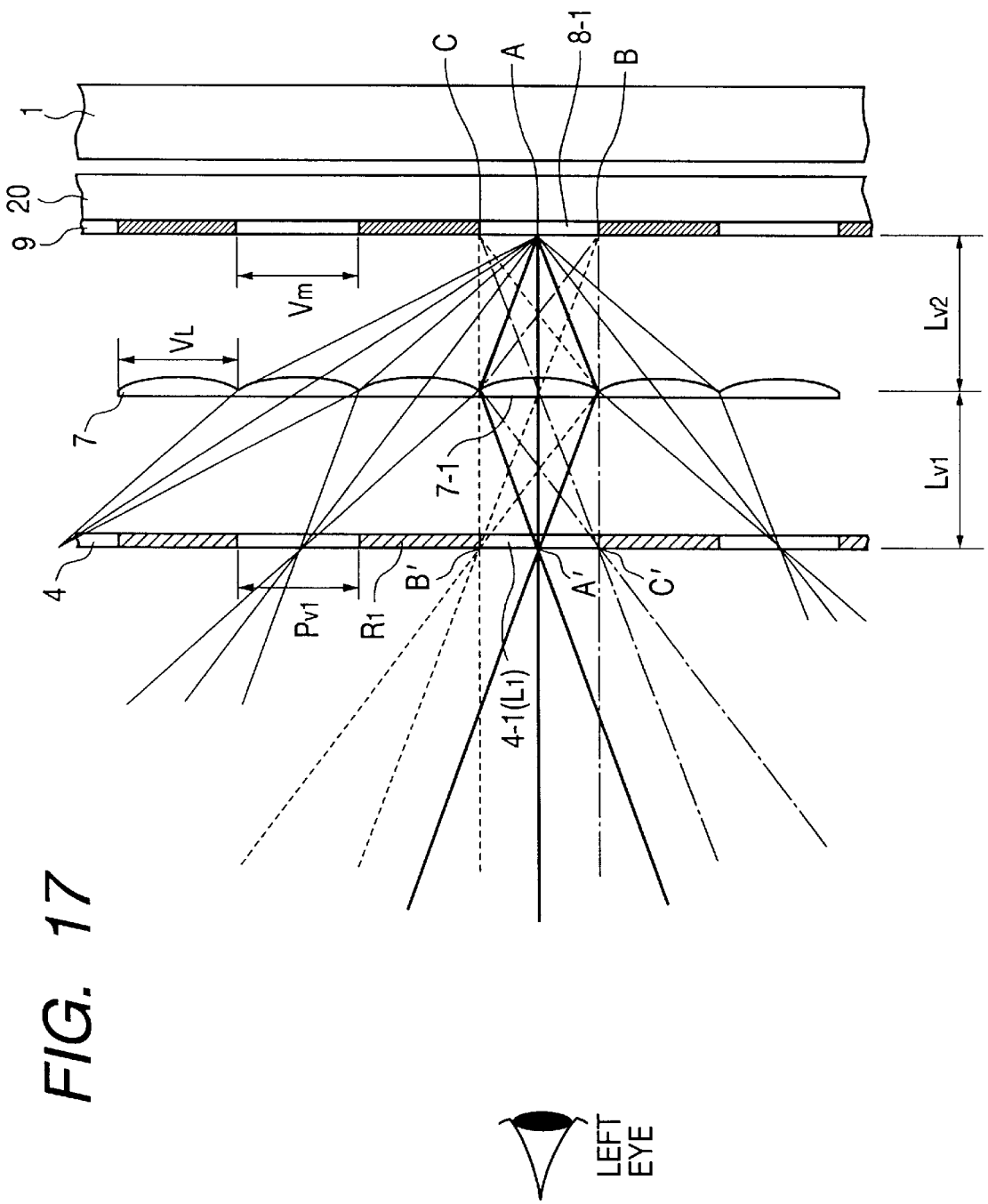
FIG. 17 is a sectional view for explaining the function of the vertical section of the sixth embodiment.

FIG. 17 is a sectional view for explaining the function of the vertical section of the sixth embodiment. The observation region in the vertical direction will be described with reference to FIG. 17. In FIG. 17, the vertical lenticular lens 3 having no optical function in this section and the substrate of the display device 4 which is not directly associated with the optical function are omitted. The horizontal lenticular lens 7 is also schematically illustrated.

The aperture portions of a mask pattern 9 on the optical modulator 20 are arranged in a checkerboard pattern, as shown in FIG. 16 and correspond, in the vertical direction, to the left and right stripe pixels of a horizontal stripe image displayed on the display device 4.

The aperture pattern of the aperture portions 8 shown in FIG. 17 is to illuminate stripe pixels for one eye of the observer. In FIG. 17, assume that stripe pixels ($L_i$) for the left eye of the observer are illuminated. The solid portions of the mask pattern 9 are shielding portions for shielding light beams. For the display device 4, the left stripe pixels ($L_i$) corresponding to the left eye are represented by blank portions, and right stripe pixels ($R_i$) corresponding to the right eye are represented by hatched portions.

When the vertical width of the aperture portion 8 of the mask pattern 9 is represented by $V_m$; the pitch of each horizontal cylindrical lens of the horizontal lenticular lens 7, $V_L$; the focal length of each horizontal cylindrical lens of the horizontal lenticular lens 7 in the sheet surface of FIG. 17, $f_v$; the vertical width of a stripe pixel on the display device 4, $P_{V1}$; the converted distance between the display device 4 and the horizontal lenticular lens 7, $L_{V1}$; and the converted distance between the horizontal lenticular lens 7 and the optical modulator 20 (optical distance obtained by converting the distance between the principal point of the horizontal lenticular lens 7 on the side of the optical modulator 20 and the display surface of the optical modulator 20 into a value in the air), $L_{V2}$, these specifications satisfy conditions (3) to (5).

At this time, light beams emerging from various portions of an aperture portion 8-1 are focused only on a plurality of corresponding left stripe pixels as caustic curves perpendicular to the sheet surface, as described in FIG. 5 of the second embodiment.

These light beams diverge only in the vertical direction in accordance with the NA in focusing. When the eyes of the observer are set at a predetermined height, an observation region where the left and right images can be uniformly separately observed over the total vertical width of the screen can be obtained.

A case wherein the observer observes the left stripe pixels with the left eye has been described. The same function as described above can be obtained when right stripe pixels are observed.

Figure 18:
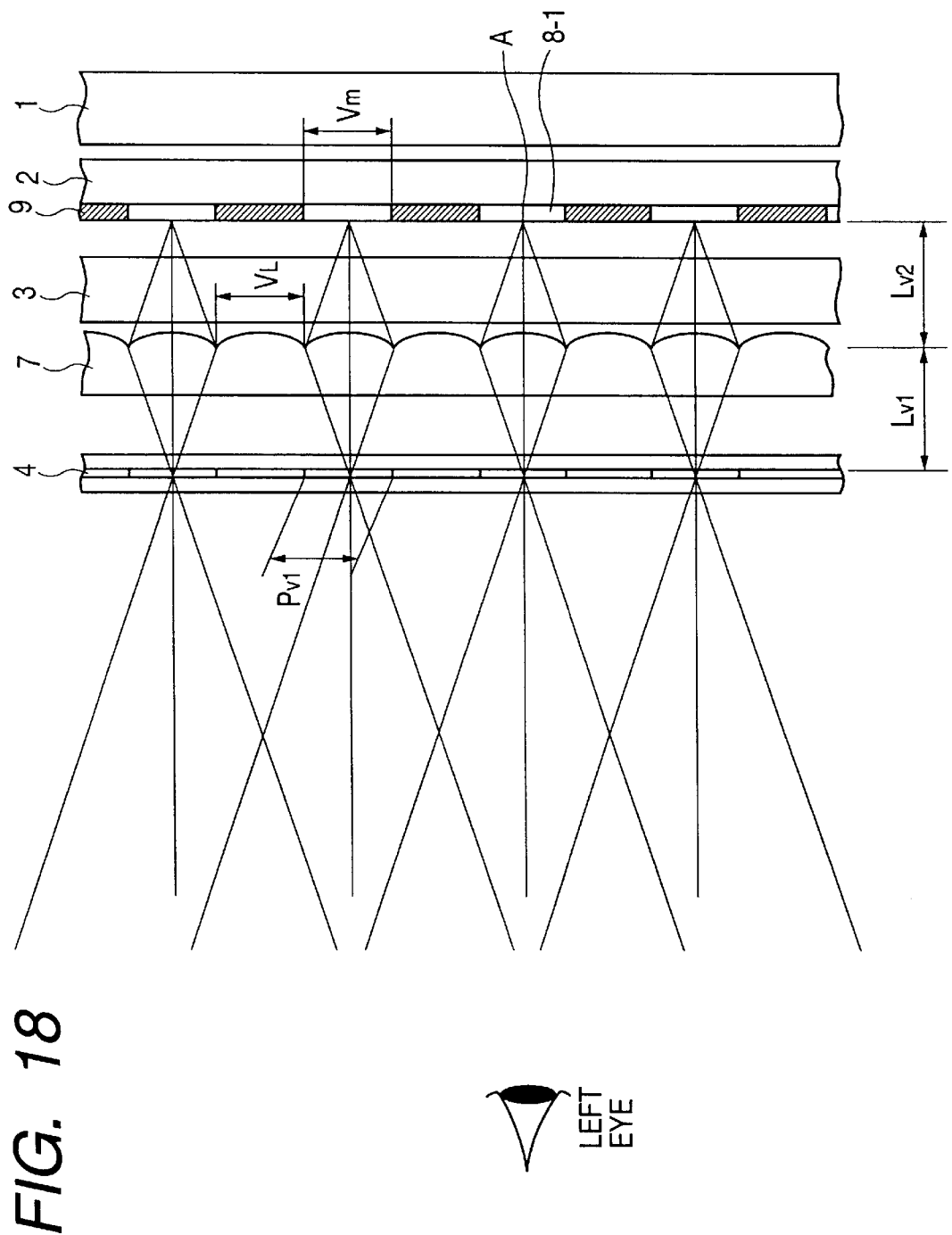
FIG. 18 is a sectional view of the sixth embodiment taken along the vertical direction.

FIG. 18 is a sectional view of this embodiment taken along the vertical direction. In FIG. 18, members omitted in FIG. 17 are illustrated. When the vertical width of the aperture portion 8 of the mask pattern 9 is represented by $V_m$; the pitch of each horizontal cylindrical lens of the horizontal lenticular lens 7, $V_L$; the vertical width of a stripe pixel on the display device 4, $P_{V1}$; the converted distance between the display device 4 and the horizontal lenticular lens 7, $L_{V1}$; the converted distance between the horizontal lenticular lens 7 and the optical modulator 20, $L_{V2}$, and the focal length of each horizontal cylindrical lens of the horizontal lenticular lens 7 in the sheet surface of FIG. 18, $f_V$, these specifications are set as follows to satisfy conditions (3) to (5):

$$P_{V1}=V_m=V_L, L_{V1}=L_{V2}, f_V=L_{V1}/2$$

As described above in FIG. 17, an observation region where the left and right stripe pixels can be uniformly separately observed from a predetermined eye height position of the observer over the total vertical width of the screen can be obtained.

In this arrangement, the optical function in the vertical direction need only satisfy equations (3) to (5). The converted distance $L_{V2}$ between the optical modulator 20 and the horizontal lenticular lens 7 can be arbitrarily increased. The vertical lenticular lens 3 can be arranged/set independently of the characteristics of the horizontal lenticular lens 7 as far as the vertical lenticular lens 3 does not physically interfere with the remaining members. When the vertical lenticular lens 3 is arranged close to the horizontal lenticular lens 7, a converted distance $L_{h2}$ between the optical modulator 20 and the vertical lenticular lens 3 can be arbitrarily increased.

For this reason, in this embodiment as well, even when a horizontal pixel size $P_{h2}$ of the optical modulator 20 is set to be equal to or larger than that of the display device 4, the observation region can be moved in the left or right direction using a smaller unit than a distance E between the eyes as far as the converted distance $L_{h2}$ between the optical modulator 20 and the vertical lenticular lens 3 is set at a larger value according to the horizontal pixel size, as in the fifth embodiment.

In this embodiment, since $P_{V1}=V_m=P_{V2}$ is set, the display device 4 for displaying an image and the optical modulator 20 for forming a mask pattern can be constituted by identical LCDs.

Movement of the observation region in the front-and-rear direction, which has not been described in the above embodiments, will be described next. When a pitch $H_L$ of each vertical cylindrical lens of the vertical lenticular lens 3 and the converted distance $L_{h2}$ between the optical modulator 20 and the vertical lenticular lens 3 are fixed, and a horizontal width $H_m$ of a pair of an aperture portion and a shielding portion on the mask pattern formed on the optical modulator 20 in the horizontal direction is set as a variable, equations (9) and (10) below hold in accordance with conditions (1) and (2):

$$L_{h1} = L_{h2} \cdot \frac{H_L}{(H_m - H_L)} \quad (9)$$

$$E = H_m \cdot \frac{H_L}{\{2 \cdot (H_m - H_L)\}} \quad (10)$$

The observation distance $L_{h1}$ can be changed by changing the width (pitch) $H_m$. In this case, E represents the interval between a region illuminated with light beams having image information for the right eye and a region illuminated with light beams having image information for the left eye. As far as the distance E is larger than the average distance between the eyes of observers, i.e., 65 mm, no problem is posed in observing a stereoscopic image.

A pair of an aperture portion and a shielding portion formed on the mask pattern 9 in the horizontal direction can be changed using, as a unit, the horizontal pixel size $P_{h2}$ of the optical modulator 20.

For example, $P_{h2}$ is set at 0.1 mm, $L_{h2}$ is set at 20 mm, and $H_L$ is set at 3.8806 mm. When $L_{h1}$ is set at 650 mm, E is set at 65 mm, and $H_m$ is set at 4 mm in a reference state, each of the pair of an aperture portion and a shielding portion formed on the mask pattern 9 in the horizontal direction is constituted by 20 pixels. When an aperture portion is constituted by 19 pixels, and a shielding portion is constituted by 20 pixels, $H_m$ is 3.9 mm, so that the observation distance $L_{h1}$ can be changed to 1,959 mm in accordance with equation (9).

To more finely change the observation distance, n aperture portions and n shielding portions are used as one unit, and the sizes of some aperture portions and shielding portions in this unit are changed. Consequently, the pitch size can be effectively more finely changed.

Figure 19:
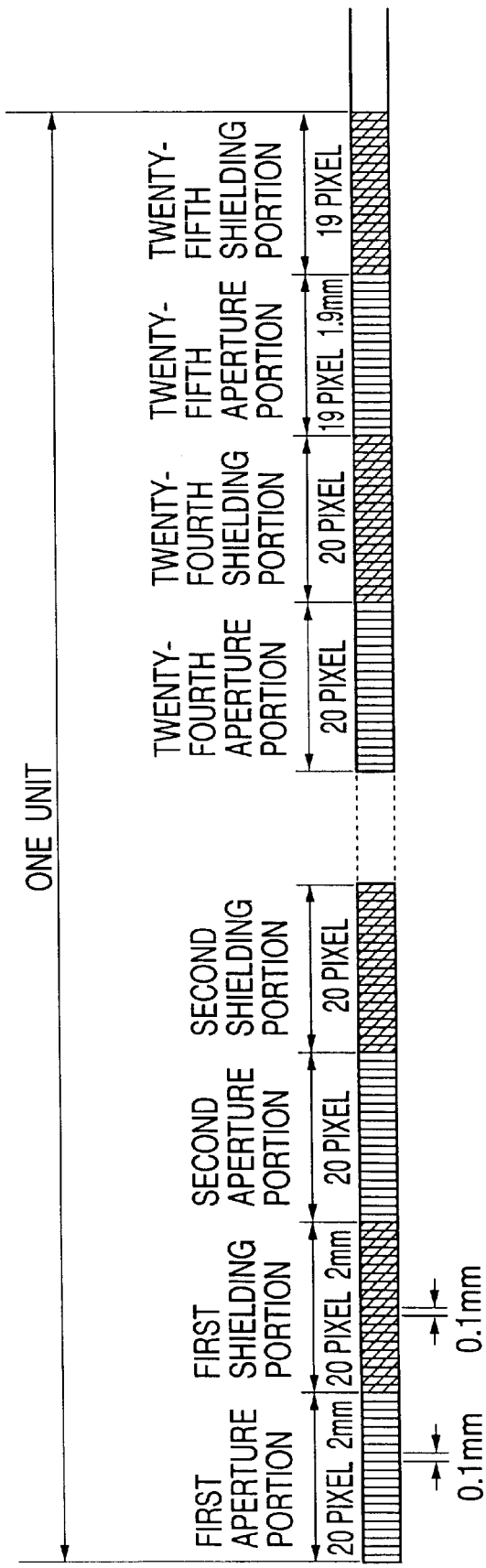
FIG. 19 is an explanatory view of combined apertures.

FIG. 19 is an explanatory view of combined apertures. As shown in FIG. 19, e.g., 25 aperture portions and 25 shielding portions are set as one unit. Each of one aperture portion and one shielding portion in this unit is constituted by 19 pixels.

Each of the remaining aperture portions and shielding portions is constituted by 20 pixels. When this unit is repeated, the effective pitch $H_m$ is represented as follows:

(2 mm·24+1.9 mm+2 mm·24+1.9 mm)/25=3.992 mm

The observation distance $L_{h1}$ can be changed to 697 mm. This method will be called a combined pitch method hereinafter.

Table 2 shows an example of actual design values according to the arrangement of this embodiment.

TABLE 2

| | |
|---|---|
| $H_{m1}/2$ | the horizontal width (horizontal size) of one aperture portion or one shielding portion having a reference size on the mask pattern |
| $H_{m2}/2$ | the horizontal width (horizontal size) of one aperture portion or one shielding portion having another size on the mask pattern |
| $H_m$ effective | the effective horizontal width of a pair of an aperture portion and a shielding portion on the mask pattern |
| $H_L$ | the pitch of each vertical cylindrical lens of the vertical lenticular lens |
| $P_{V1}$ | the vertical-size width of a stripe pixel on the display device |
| $P_{V2}$ | the vertical pixel size of the optical modulator |
| $L_{h1}$ | the converted distance between the observer and the vertical lenticular lens |
| $L_{h2}$ | the converted distance between the vertical lenticular lens and the mask pattern |
| $V_L$ | the pitch of each horizontal cylindrical lens of the horizontal lenticular lens |
| $L_{V1}$ | the converted distance between the display device and the horizontal lenticular lens |
| $L_{V2}$ | the converted distance between the horizontal lenticular lens and the mask pattern |
| $P_{h1}$ | the horizontal pixel size of the display device |
| $P_{h2}$ | the horizontal pixel size of the optical modulator |
| $f_h$ | the focal length of each vertical cylindrical lens of the vertical lenticular lens in the horizontal section |
| $f_V$ | the focal length of each horizontal cylindrical lens of the horizontal lenticular lens in the vertical section |
| E | the interval of light beams separated at the observation position in the horizontal direction, which have been transmitted through the left and right stripe pixels |
| N apertures | the number of aperture portions in one unit in the combined pitch method |
| N shieldings | the number of shielding portions in one unit in the combined pitch method |
| n apertures | the number of aperture portions each having a size different from the reference size in one unit in the combined pitch method |
| n shieldings | the number of shielding portions each having a size different from the reference size in one unit in the combined pitch method |

| | | | | | | | | | | (mm) |
|---|---|---|---|---|---|---|---|---|---|---|
| $L_{h2}$ | $P_{h1}$ | $P_{h2}$ | $P_{V1}$ | $P_{V2}$ | $L_{V1}$ | $L_{V2}$ | $V_L$ | $H_L$ | $f_h$ | $f_V$ |
| 20 | 0.1 | 0.1 | 0.3 | 0.3 | 22 | 22 | 0.3 | 3.8806 | 20 | 11 |

| $L_{h1}$ (mm) | E (mm) | N apertures | N shieldings | n apertures | n shieldings | $H_{m1}/2$ (mm) | $H_{m2}/2$ (mm) | $H_m$ effective (mm) |
|---|---|---|---|---|---|---|---|---|
| 650 | 65 | . | . | . | . | . | . | 4 |

TABLE 2-continued

| | | | | | | | | |
|---|---|---|---|---|---|---|---|---|
| 696.7 | 69.5 | 25 | 25 | 1 | 1 | 2 | 1.9 | 3.992 |
| 746.1 | 74.3 | 26 | 26 | 2 | 2 | 2 | 1.9 | 3.985 |
| 750.6 | 74.8 | 25 | 25 | 2 | 2 | 2 | 1.9 | 3.984 |
| 813.5 | 80.8 | 25 | 25 | 3 | 3 | 2 | 1.9 | 3.976 |

In this embodiment, the horizontal pixel size of the optical modulator 20 is set at 0.1 mm, one aperture portion or one shielding portion is formed by 20 pixels, i.e., the reference size is set at 2 mm, thereby moving the observation region in units of E/20. In addition, a total of 50 aperture portions and shielding portions are used as one unit, and the observation position is changed in the front-and-rear direction using the combined pitch method.

When a position detection means for detecting the position of the observer is set in the stereoscopic image display apparatus of the present invention to detect the position of the observer, and the mask pattern on the optical modulator 20 is changed on the basis of the position information, the stereoscopic image region can be moved in the left-and-right direction and in the front-and-rear direction to follow the movement of the observer.

Figure 20:
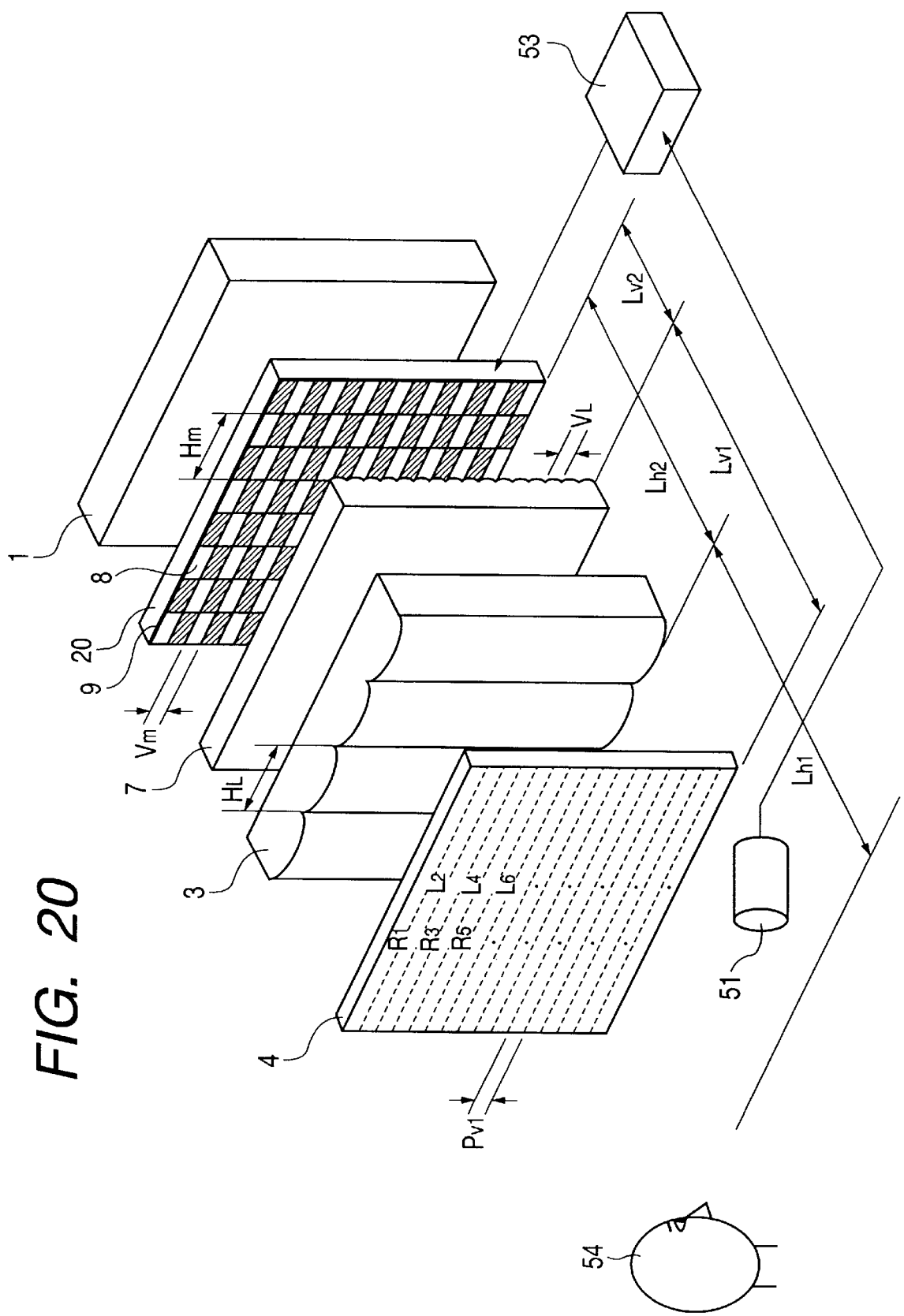
FIG. 20 is a schematic perspective view of a stereoscopic image display apparatus according to the seventh embodiment of the present invention.

FIG. 20 is a schematic perspective view of a stereoscopic image display apparatus according to the seventh embodiment of the present invention. In this embodiment, a position detection means for detecting the position of the observer is set in the sixth embodiment, thereby causing the observation region to follow the movement of the observer. The stereoscopic image display unit is the same as that of the sixth embodiment.

In FIG. 20, a position sensor 51 (position detection means) detects the position of an observer 54. Many methods of detecting the position of the observer are conventionally proposed. In this embodiment, various methods can be used to detect the horizontal position of the observer. For example, the image of the observer is picked up with a TV camera, and the central position of the face of the observer is obtained by image processing. To detect the distance of the observer in the front-and-rear direction, a known so-called auto-focusing method of a camera or the like may be used. A control unit 53 forms a mask pattern 9 on an optical modulator 20 on the basis of the position information of the observer.

The stereoscopic image region following function of this embodiment will be described. The position sensor 51 detects the position of the observer in the left-and-right direction and in the front-and-rear direction. In this embodiment, control is performed in the following manner.

(1) The position sensor 51 detects a horizontal shift x of the observer 54 from a predetermined reference position of the observer and a distance $L_0$ from a display device 4 to the observer 54, which is measured in a direction perpendicular to the display surface of the display device 4. (Exactly, not the distance $L_0$ but a distance $L_{h1}$ from a vertical lenticular lens 3 to the observer is measured. However, since $L_{h1} \cong L_0$, the observation distance $L_0$ from the display device 4 is used).

(2) The control unit 53 calculates equation (11) for the detected distance $L_0$ to obtain a horizontal width $H_m$ of a pair of an aperture portion and a shielding portion of the mask pattern 9 to be displayed on the optical modulator 20:

$$H_m = \frac{(L_0 + L_{h2})}{L_0} \cdot H_L \quad (11)$$

For a case wherein the width $H_m$ is not an integer multiple of a horizontal pixel size $P_{h2}$ of the optical modulator 20, the control unit 53 has, in its ROM (memory), data for forming an optimum mask pattern corresponding to the observation distance $L_0$ {the number of aperture portions and shielding portions in one unit in the combined pitch method, the number of aperture portions and shielding portions having another pitch, the reference pitch size, a plurality of positive integer strings $(k_1, k_2, \ldots, k_n)_i$ corresponding to a plurality of observation distances $L_{0i}$, and the like}, so that aperture portions and shielding portions each having an appropriate size are displayed in accordance with the horizontal shift x and the distance $L_0$.

Alternatively, positive integer strings $(k_1, k_2, \ldots, k_n)_i$ which are set in advance according to the following equation associated with the plurality of distances $L_{0i}$ are recorded in the memory:

$$L_{0i} = L_{h2} \cdot H_L \bigg/ \left\{ \sum_{j=1}^{n} (k_j \cdot P_{h2})/n - H_L \right\}$$

An integer string $(k_1, k_2, \ldots, k_n)_k$ is selected in accordance with the distance $L_0$ from the display device to the observer, which is measured in a direction perpendicular to the display surface of the display device by the position detection means. Using the integer string $(k_1, k_2, \ldots, k_n)_k$, the horizontal size of the jth aperture portion and the jth shielding portion in one unit is set to $k_j$ times the pixel size $P_{h2}$ to form aperture portions and shielding portions. With this operation, a checkerboard mask pattern corresponding to the distance $L_0$ is displayed.

With the above arrangement, even when the observer position is shifted in the horizontal direction or in the front-and-rear direction from the predetermined reference position, a satisfactory stereoscopic image can be displayed without generating crosstalk or a reversed stereoscopic image.

In this embodiment, a backlight source 1 and the optical modulator 20 are used to form a patterned light source. Even when a self-emission type display element such as a CRT is used to form a patterned light source, the stereoscopic image display apparatus of this embodiment can be constituted.

Figure 21:
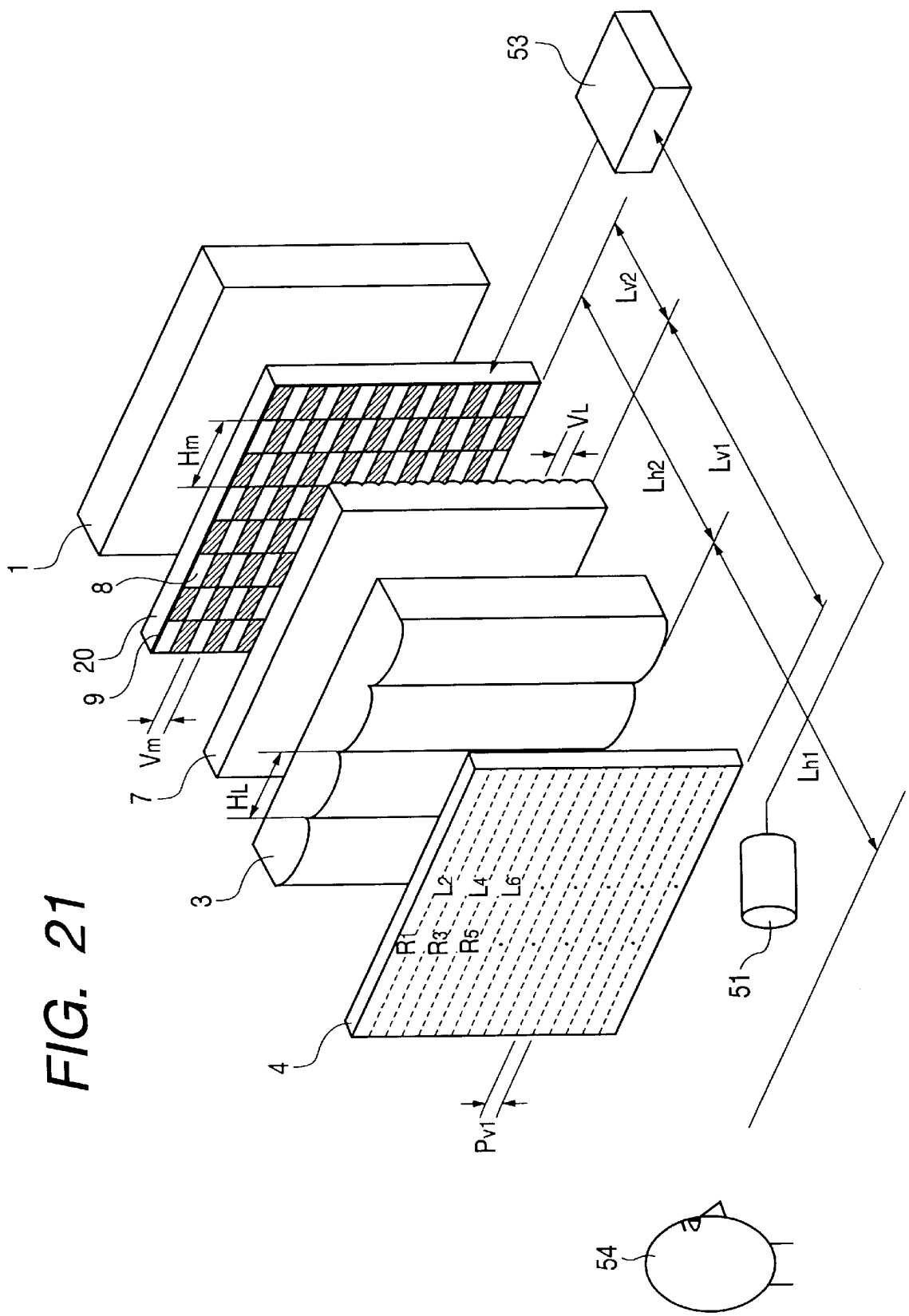
FIG. 21 is a schematic perspective view of a stereoscopic image display apparatus according to the eighth embodiment of the present invention.
Figure 22A:
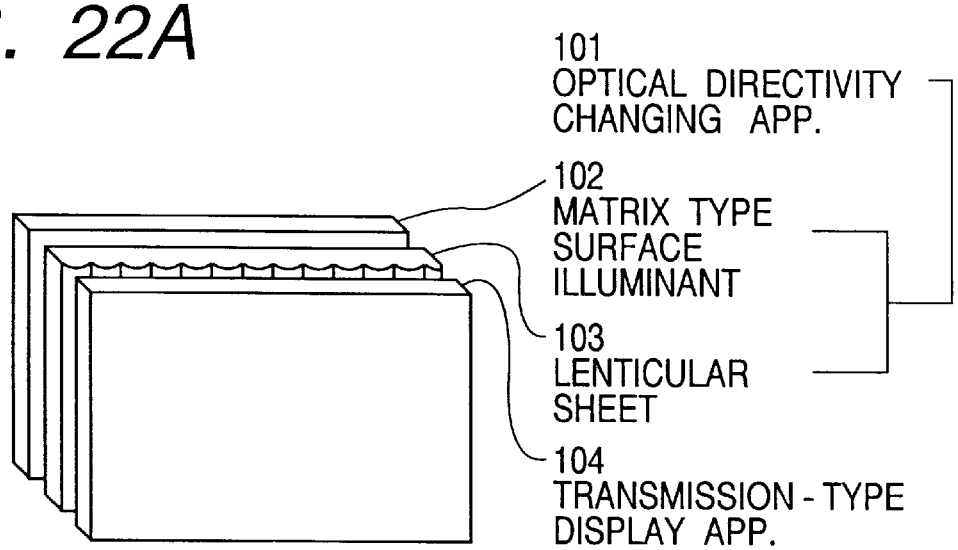
FIGS. 22A, 22B, and 22C are views showing the basic arrangement of a conventional stereoscopic image display apparatus.
Figure 22B:
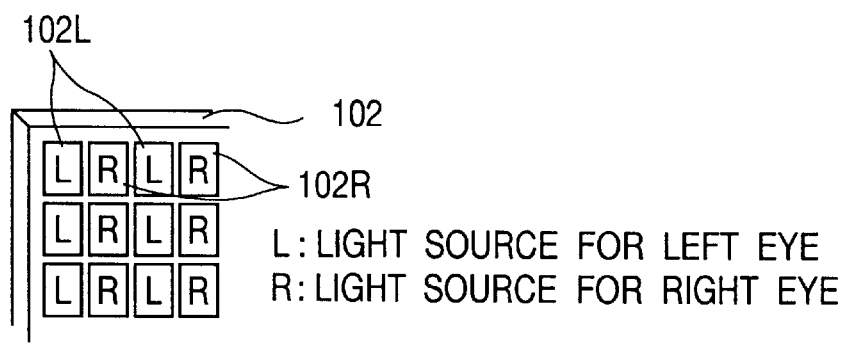
Figure 22C:
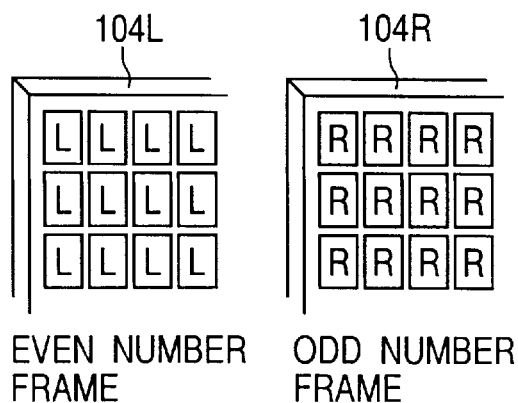

FIG. 21 is a schematic perspective view of a stereoscopic image display apparatus according to the eighth embodiment of the present invention. In this embodiment, the arrangement order of two lenticular lenses is reversed to that in the seventh embodiment.

In this embodiment as well, the specifications of members are set such that equations (1) to (5) described above hold. In this embodiment, the vertical optical function and the horizontal optical function are independent, as in the sixth and seventh embodiments.

In the seventh embodiment, since the converted distance $L_{h2}$ between the optical modulator 20 and the vertical lenticular lens 3 is increased, the converted distance $L_{v2}$ between the horizontal lenticular lens 7 and the optical modulator 20 and the converted distance $L_{v1}$ between the horizontal lenticular lens 7 and the display device 4 must be set to be larger than the converted distance $L_{h2}$. The converted distance between the optical modulator 20 and the display device 4 is larger than twice the converted distance $L_{h2}$, so the apparatus tends to be thick.

In this embodiment, a vertical lenticular lens 3 is separated from an optical modulator 20 by a distance larger than that between a horizontal lenticular lens 7 and the optical modulator 20. Therefore, the converted distance between a display device 4 and the optical modulator 20 can be made almost equal to a converted distance $L_{h2}$ between the optical modulator 20 and the vertical lenticular lens 3, so that the thickness of the entire apparatus can be reduced.

As described above, in the present invention, the same effect as described above can be obtained independently of the arrangement order of the two lenticular lenses as far as the apparatus is constituted to satisfy conditions (1) to (5). This is because the vertical optical function and the horizontal optical function are independent, as described above.

In this embodiment, the observation region can be moved in the left-and-right direction and in the front-and-rear direction by the same method as that of the seventh embodiment. In addition, when a sensor for detecting the position of the observer is attached, and the mask pattern to be displayed in changed on the basis of the output of the position sensor, the observation region can be caused to follow the movement of the observer.

Table 3 shows an example of actual design values according to the arrangement of this embodiment.

TABLE 3

| | |
|---|---|
| $H_{m1}/2$ | the horizontal width (horizontal size) of one aperture portion or one shielding portion having a reference size on the mask pattern |
| $H_{m2}/2$ | the horizontal width (horizontal size) of one aperture portion or one shielding portion having another size on the mask pattern |
| $H_m$ effective | the effective horizontal width of a pair of an aperture portion and a shielding portion on the mask pattern |
| $H_L$ | the pitch of each vertical cylindrical lens of the vertical lenticular lens |
| $P_{V1}$ | the vertical-size width of a stripe pixel on the display device |
| $P_{V2}$ | the vertical pixel size of the optical modulator |
| $L_{h1}$ | the converted distance between the observer and the vertical lenticular lens |
| $L_{h2}$ | the converted distance between the vertical lenticular lens and the mask pattern |
| $V_L$ | the pitch of each horizontal cylindrical lens of the horizontal lenticular lens |
| $L_{V1}$ | the converted distance between the display device and the horizontal lenticular lens |
| $L_{V2}$ | the converted distance between the horizontal lenticular lens and the mask pattern |
| $P_{h1}$ | the horizontal pixel size of the display device |
| $P_{h2}$ | the horizontal pixel size of the optical modulator |
| $f_{h1}$ | the focal length of each vertical cylindrical lens of the vertical lenticular lens in the horizontal section |
| $f_v$ | the focal length of each horizontal cylindrical lens of the horizontal lenticular lens in the vertical section |
| E | the interval of light beams separated at the observation position in the horizontal direction, which have been transmitted through the left and right stripe pixels |
| N apertures | the number of aperture portions in one unit in the combined pitch method |
| N shieldings | the number of shielding portions in one unit in the combined pitch method |
| n apertures | the number of aperture portions each having a size different from the reference size in one unit in the combined pitch method |

TABLE 3-continued

| | |
|---|---|
| n shieldings | the number of shielding portions each having a size different from the reference size in one unit in the combined pitch method |

| $L_{h2}$ | $P_{h1}$ | $P_{h2}$ | $P_{V1}$ | $P_{V2}$ | $L_{V1}$ | $L_{V2}$ | $V_L$ | $H_L$ | $f_h$ | (mm) $f_V$ |
|---|---|---|---|---|---|---|---|---|---|---|
| 24 | 0.1 | 0.1 | 0.3 | 0.3 | 14 | 14 | 0.3 | 5.0 | 20 | 11 |

| $L_{h1}$ (mm) | E (mm) | N apertures | N shieldings | n apertures | n shieldings | $H_{m1}/2$ (mm) | $H_{m2}/2$ (mm) | $H_m$ effective (mm) |
|---|---|---|---|---|---|---|---|---|
| 600 | 65 | . | . | . | . | . | . | 5.2 |
| 631.6 | 68.3 | 20 | 20 | 1 | 1 | 2.6 | 2.5 | 5.19 |
| 666.6 | 71.9 | 20 | 20 | 2 | 2 | 2.6 | 2.5 | 5.18 |
| 705.8 | 76.0 | 20 | 20 | 3 | 3 | 2.6 | 2.5 | 5.17 |

What is claimed is:

1. A stereoscopic image display apparatus for causing an observer to observe a stereoscopic image, comprising:

light source means for illuminating, with a surface illuminant, a mask substrate on which a mask pattern including aperture portions and shielding portions arranged in a checkered pattern is formed, said mask substrate having a discrete pixel structure in which each pixel is capable of switching between one of a shielding state and non-shielding state to the other state, and the checkered pattern is formed by arrangement of the pixels of the shielding state and the pixels of the non-shielding state;

a vertical cylindrical lens array including vertical cylindrical lenses each having a generatrix in a vertical direction; and a transmission type display device for displaying an image on scanning lines, wherein stripe pixels for right eye and stripe pixels for left eye obtained by dividing a parallax image for a right eye and a parallax image for a left eye into a number of horizontal stripe pixels are alternately arranged in a predetermined order to form one image, thereby displaying a horizontal stripe image on said display device, light beams emitted from said light source means, to which directivity is given by said vertical cylindrical lens array, irradiate the horizontal stripe image, the light beams are separately condensed on at least two regions to make the observer see the horizontal stripe image as a stereoscopic image, and a horizontal width of at least one of an aperture portion and a shielding portion arranged on said mask pattern in a horizontal direction is set to be not less than twice a horizontal pixel size of said mask substrate.

2. An apparatus according to claim 1, wherein when an optical distance between said vertical cylindrical lens array and said mask pattern is represented by $L_{h2}$; an optical distance between a predetermined observation position and said vertical cylindrical lens array, $L_{h1}$; a predetermined distance between eyes of the observer, E; and the horizontal width of said pair of an aperture portion and a shielding portion arranged on said mask pattern in the horizontal direction, $H_m$, the following condition is satisfied:

$H_m = 2E \cdot L_{h2}/L_{h1}$.

3. An apparatus according to claim 1, further comprising a horizontal cylindrical lens array arranged between said mask pattern and said display device and comprised of horizontal cylindrical lenses each having a generatrix in the horizontal direction.

4. An apparatus according to claim 3, wherein said vertical cylindrical lens array converts a light beam emerging from one point of the aperture portion into a substantially collimated light beam in a horizontal section, and said horizontal cylindrical lens array substantially focuses the light beam emerging from one point of the aperture portion onto a predetermined position of said display device in a vertical section.

5. An apparatus according to claim 3, wherein an optical distance between said mask pattern and said vertical cylindrical lens array is set to be larger than a converted distance between said mask pattern and said horizontal cylindrical lens array.

6. An apparatus according to claim 1, wherein a vertical width of the aperture portion is made to correspond to a width of a plurality of scanning lines of said display device.

7. An apparatus according to claim 6, wherein a vertical width of a horizontal stripe pixel displayed on said display device is made equal to the width of the plurality of scanning lines of said display device, which corresponds to the vertical width of the aperture portion.

8. A stereoscopic image display apparatus for causing an observer to observe a stereoscopic image, comprising:

light source means for illuminating, with a surface illuminant, a mask substrate on which a mask pattern including aperture portions and shielding portions arranged in a checkered pattern is formed, said mask substrate having a discrete pixel structure in which each pixel is capable of switching between one of a shielding state and non-shielding state to the other state, with the checkered pattern formed by arrangement of the pixels of the shielding state and the pixels of the non-shielding state;

a vertical cylindrical lens array including vertical lenses each having a generatrix in a vertical direction;

a horizontal cylindrical lens array including horizontal cylindrical lenses each having a generatrix in a horizontal direction; and a transmission type display device for displaying an image on scanning lines, wherein stripe pixels for right eye and stripe pixels for left eye obtained by dividing a parallax image for a right eye and a parallax image for a left eye into a number of horizontal stripe pixels are alternately arranged in a predetermined order to form one image, thereby displaying a horizontal stripe image on said display device, light beams emitted from said light source means, to which directivity is given by said vertical cylindrical lens array, irradiate the horizontal stripe image, the light beams are separated into at least two regions to make the observer see the horizontal stripe image as a stereoscopic image, said vertical cylindrical lens array converts a light beam emerging from one point of the aperture portion into a substantially collimated light beam in a horizontal section, said horizontal cylindrical lens array substantially condenses the light beam emerging from one point of the aperture portion onto said display device in a vertical section, a converted distance between said mask pattern and said vertical cylindrical lens array is set to be larger than a converted distance between said mask pattern and said horizontal cylindrical lens array, and a vertical width of the aperture portion is made to correspond to a width of a plurality of scanning lines of said mask substrate.

9. An apparatus according to claim 8, wherein said vertical cylindrical lens array or said horizontal cylindrical lens array has plano-convex cylindrical lenses.

10. A stereoscopic image display apparatus for causing an observer to observe a stereoscopic image, comprising:

light source means whose light-emission pattern including light-emitting portions and non-emitting portions arranged in a checkered pattern is formed by a display element having a discrete pixel structure, each pixel of said light display element being capable of switching between one of light emitting state and non-emitting state to the other state, with the checkered pattern being formed by arrangement of the pixels of the light-emitting state and the pixels of the non-emitting state;

a vertical cylindrical lens array including vertical cylindrical lenses each having a generatrix in a vertical direction; and a transmission type display device having a discrete pixel structure to display an image on scanning lines, wherein stripe pixels for right eye and stripe pixels for left eye obtained by dividing a parallax image for a right eye and a parallax image for a left eye into a number of horizontal stripe pixels are alternately arranged in a predetermined order to form one image, thereby displaying a horizontal stripe image on said display device, light beams emitted from said light source means, to which directivity is given by said vertical cylindrical lens array, irradiate the horizontal stripe image, the light beams are separately condensed on at least two regions to make the observer see the horizontal stripe image as a stereoscopic image, and a horizontal width of at least one of a light-emitting portion and a non-emitting portion arranged on said light-emission pattern in a horizontal direction is not less than twice a horizontal pixel size of said display element.

11. An apparatus according to claim 10, wherein said light source means has a self-emission type display element having a discrete pixel structure.

12. An apparatus according to claim 10, wherein said light source means has means for forming a mask pattern including aperture portions and shielding portions arranged in a checkerboard pattern on a display surface of an optical modulator having a discrete pixel structure and illuminating said mask pattern with a surface illuminant.

13. An apparatus according to claim 10, further comprising a horizontal cylindrical lens array arranged between said light source means and said display device and comprised of horizontal cylindrical lenses each having a generatrix in the horizontal direction, and wherein a light beam emerging from one point of said light-emitting portion is focused onto said display device as a caustic curve.

14. An apparatus according to claim 13, wherein when a vertical width of a right or left stripe pixel on said display device is represented by $P_{V1}$; a vertical width of said light-emitting portion, $V_m$; a vertical pitch of said horizontal cylindrical lens, $V_L$; a converted distance between said display device and said horizontal cylindrical lens array, $L_{V1}$; a converted distance between said horizontal cylindrical lens array and said light source means, $L_{V2}$; and a focal length of said horizontal cylindrical lens in a vertical section, $f_V$, the following conditions are satisfied:

$$P_{V1}:V_m = L_{V1}:L_{V2}$$

$$P_{V1}:V_L = (L_{V1}+L_{V2})/2:L_{V2}$$

$$1/f_V = 1/L_{V1} + 1/L_{V2}.$$

15. An apparatus according to claim 10, wherein when a converted distance between said vertical cylindrical lens array and said light source means is represented by $L_{h2}$; a converted distance between a predetermined observation position and said display device, $L_{h1}$; a predetermined distance between eyes of the observer, E; and the horizontal pixel size of said display element, $P_{h2}$, the following condition is satisfied:

$L_{h2} > P_{h2} \cdot L_{h1}/E.$

16. An apparatus according to claim 10, wherein when a converted distance between said vertical cylindrical lens array and said light source means is represented by $L_{h2}$; a converted distance between a predetermined observation position and said display device, $L_{h1}$; a predetermined distance between eyes of the observer, E; and the horizontal pixel size of said display element, $P_{h2}$, the following condition is satisfied:

$L_{h2} = k \cdot P_{h2} \cdot L_{h1}/E.$ where k is a predetermined integer not less than 2.

17. An apparatus according to claim 10, wherein when a converted distance between said vertical cylindrical lens array and said light source means is represented by $L_{h2}$; a converted distance between a predetermined observation position and said display device, $L_{h1}$; and the horizontal pixel size of said display element, $P_{h2}$, said light-emitting portions are moved in the horizontal direction in units of $P_{h2}$, thereby moving said regions where light beams having information of said right stripe pixels and light beams having information of left stripe pixels are separately condensed, in the horizontal direction using the following value as a unit:

$Ph2 \cdot Lh1/Lh2.$

18. An apparatus according to claim 10, further comprising position detection means for detecting a position of the observer, and wherein a horizontal positional shift of the observer from a predetermined reference position is detected by said position detection means, and said light-emitting portions are moved in the horizontal direction in accordance with the positional shift.

19. An apparatus according to claim 10, wherein said light-emission pattern is formed by repeatedly arranging a unit in which a light-emitting portion and a non-emitting portion each having a predetermined size are repeated a predetermined number of times in the horizontal direction, and each of a plurality of light-emitting portions and non-emitting portions in the unit include one of at least two different numbers of pixels in the horizontal direction, and further comprising:

means for detecting a distance of an observer from said display device; and means for controlling the horizontal width of the light-emitting portion on the basis of the detected distance.

20. An apparatus according to claim 19, wherein said light-emission pattern is formed by repeating a unit including n light-emitting portions and n non-emitting portions in the horizontal direction, a horizontal size of a jth (j=1, ..., n) light-emitting portion or a jth non-emitting portion is set to be $k_j$-times the horizontal pixel size $P_{h2}$ of said display element using predetermined positive integers $k_1, k_2, \ldots, k_n$, and when a horizontal pitch of said vertical cylindrical lens is represented by $H_L$; and a converted distance between said vertical cylindrical lens array and said light source means, $L_{h2}$, a distance $L_0$ from said display device to said regions where light beams having information of said right stripe pixels and light beams having information of left stripe pixels are separately condensed is changed according to the following equation:

$$L_0 = L_{h2} \cdot H_L \Big/ \left\{ \sum_{j=1}^{n} (k_j \cdot P_{h2})/n - H_L \right\}.$$

21. An apparatus according to claim 19, further comprising position detection means for detecting a position of the observer, and a memory recording a predetermined positive integer string $(k_1, k_2, \ldots, k_n)_k$ which is set for a plurality of distances $L_{0i}$ in advance in accordance with the following equation:

$$L_{0i} = L_{h2} \cdot H_L \Big/ \left\{ \sum_{j=1}^{n} (k_j \cdot P_{h2})/n - H_L \right\}$$

where $H_L$ is the horizontal pitch of said vertical cylindrical lens, $L_{h2}$ is a converted distance between said vertical cylindrical lens array and said light source means, and $P_{h2}$ is the horizontal pixel size of said display element, and wherein said light-emission pattern is formed by repeating a unit including n light-emitting portions and n non-emitting portions in the horizontal direction, the integer string $(k_1, k_2, \ldots, k_n)_k$ is selected in accordance with a distance $L_0$ from said display device to the observer, which is measured by said position detection means in a direction perpendicular to said display surface of said display device, and a horizontal size of an ith light-emitting portion and an ith non-emitting portion in the unit is set to be $k_j$-times the pixel size $P_{h2}$ using the integer string $(k_1, k_2, \ldots, k_n)_k$.

22. A stereoscopic image display apparatus for causing an observer to observe a stereoscopic image, comprising:

light source means for illuminating, with a surface illuminant, a mask substrate on which a mask pattern including aperture portions and shielding portions arranged in a checkerboard pattern is formed;

a vertical cylindrical lens array including vertical cylindrical lenses each having a generatrix in a vertical direction; and a transmission type display device for displaying an image on scanning lines, wherein right stripe pixels and left stripe pixels obtained by dividing a parallax image for a right eye and a parallax image for a left eye into a number of horizontal stripe pixels are alternately arranged in a predetermined order to form one image, thereby displaying a horizontal stripe image on a display surface of said display device, light beams emitted from said light source means, to which directivity is given by said vertical cylindrical lens array, irradiate the horizontal stripe image, the light beams are separately condensed on at least two regions to make the observer see the horizontal stripe image as a stereoscopic image, and a vertical width of the aperture portion is smaller than that of said shielding portion.

23. A stereoscopic image display apparatus for causing an observer to observe a stereoscopic image, comprising:

light source means whose light-emission pattern including light-emitting portions and non-emitting portions arranged in a checkerboard pattern is formed by a display element having a discrete pixel structure;

a vertical cylindrical lens array including vertical cylindrical lenses each having a generatrix in a vertical direction; and a transmission type display device having a discrete pixel structure to display an image on scanning lines, wherein right stripe pixels and left stripe pixels obtained by dividing a parallax image for a right eye and a parallax image for a left eye into a number of horizontal stripe pixels are alternately arranged in a predetermined order to form one image, thereby displaying a horizontal stripe image on a display surface of said display device, light beams emitted from said light source means, to which directivity is given by said vertical cylindrical lens array, irradiate the horizontal stripe image, the light beams are separately condensed on at least two regions to make the observer see the horizontal stripe image as a stereoscopic image, and a vertical width of said light-emitting portion is smaller than that of said non-emitting portion.

24. An apparatus according to claim 22, wherein said light source means has a self-emission type display element having a discrete pixel structure.

25. An apparatus according to claim 22, wherein said light source means has means for forming a mask pattern including aperture portions and shielding portions arranged in a checkerboard pattern on a display surface of an optical modulator having a discrete pixel structure and illuminating said mask pattern with a surface illuminant.

26. An apparatus according to claim 1, further comprising position detection means for detecting a position of the observer, and wherein a horizontal positional shift of the observer from a predetermined reference position is detected by said position detection means, and said light-emitting portions are moved in the horizontal direction in accordance with the positional shift.

27. An apparatus according to claim 8, further comprising position detection means for detecting a position of the observer, and wherein a horizontal positional shift of the observer from a predetermined reference position is detected by said position detection means, and said light-emitting portions are moved in the horizontal direction in accordance with the positional shift.

28. An apparatus according to claim 1, wherein said aperture pattern is formed by repeatedly arranging a unit in which an aperture portion and a non-aperture portion each having a predetermined size are repeated a predetermined number of times in the horizontal direction, and each of a plurality of aperture portions and non-aperture portions in the unit includes one of at least two different numbers of pixels in the horizontal direction, and further comprising:

means for detecting a distance of an observer from said display device; and means for controlling the horizontal width of the aperture portion on the basis of the detected distance.

29. An apparatus according to claim 8, wherein said aperture pattern is formed by repeatedly arranging a unit in which an aperture portion and a non-aperture portion each having a predetermined size are repeated a predetermined number of times in the horizontal direction, and each of a plurality of aperture portions and non-aperture portions in the unit includes one of at least two different numbers of pixels in the horizontal direction, and further comprising:

means for detecting a distance of an observer from the display device; and means for controlling the horizontal width of the aperture portion on the basis of the detected distance.

* * * * *

UNITED STATES PATENT AND TRADEMARK OFFICE
CERTIFICATE OF CORRECTION

PATENT NO. : 6,160,527
DATED : December 12, 2000
INVENTOR(S) : Hideki Morishima et al.

It is certified that error appears in the above-identified patent and that said Letters Patent is hereby corrected as shown below:

Column 1,
Line 19, "Moire," should read -- Moiré, --.

Column 5,
Line 8, "$1/f_v 32\ 1/L_{v1}+1/L_{v2}$" should read -- $1/f_v=1/L_{v1}+1/L_{v2}$ --.

Column 8,
Line 49, "like." should read -- like. Figs. 2A and 2B schematically show the state of an --.

Column 27,
Line 43, "cyiindrical" should read -- cylindrical --.
Line 46, "iens" should read -- lens --.
Line 52, "$f_{h1}$" should read -- $f_h$ --.

Column 28,
Line 13, "shiled-" should read -- shield- --.

Column 31,
Line 20, "$L_{h2}=k \cdot P_{h2} \cdot L_{h1}/E.$" should read -- $L_{h2}=k \cdot P_{h2} \cdot L_{h1}/E$ --.

Signed and Sealed this

Twentieth Day of November, 2001

Attest:

NICHOLAS P. GODICI
*Attesting Officer*  *Acting Director of the United States Patent and Trademark Office*